United States Patent
Yan et al.

(10) Patent No.: US 12,349,012 B2
(45) Date of Patent: Jul. 1, 2025

(54) HANDOVER METHOD AND COMMUNICATION APPARATUS

(71) Applicant: HUAWEI TECHNOLOGIES CO., LTD., Shenzhen (CN)

(72) Inventors: Le Yan, Shenzhen (CN); Qinghai Zeng, Shanghai (CN); Tingting Geng, Shanghai (CN); Hongping Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 378 days.

(21) Appl. No.: 17/886,762

(22) Filed: Aug. 12, 2022

(65) Prior Publication Data

US 2022/0394577 A1    Dec. 8, 2022

Related U.S. Application Data

(63) Continuation of application No. PCT/CN2021/074593, filed on Feb. 1, 2021.

(30) Foreign Application Priority Data

Feb. 14, 2020 (CN) .......................... 202010093425.7

(51) Int. Cl.
    *H04W 36/00* (2009.01)
    *H04W 36/18* (2009.01)
(52) U.S. Cl.
    CPC ..... *H04W 36/0061* (2013.01); *H04W 36/185* (2023.05)
(58) Field of Classification Search
    CPC ........... H04W 36/362; H04W 36/0061; H04W 36/0079; H04W 36/00837; H04W 36/00835; H04W 36/305; H04W 36/185
    See application file for complete search history.

(56) References Cited

U.S. PATENT DOCUMENTS 11,265,774 B2 *   3/2022  Zhang .................. H04W 36/04
2015/0282033 A1 * 10/2015  Lunden ............ H04W 36/0079
                                                      455/436
(Continued)

FOREIGN PATENT DOCUMENTS

CN    110351801 A    10/2019
CN    110366212 A    10/2019
(Continued)

OTHER PUBLICATIONS

3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.

(Continued)

*Primary Examiner* — Dung Hong
(74) *Attorney, Agent, or Firm* — HAUPTMAN HAM, LLP

(57) ABSTRACT

A handover method and a communication apparatus. A terminal device receives a first message, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0. In a process of attempting to hand over from the source cell to the target cell, the terminal device maintains an RRC connection and/or data transmission with the source cell. Therefore, handover reliability is improved, a handover latency is reduced, and overall system performance is improved.

18 Claims, 9 Drawing Sheets

(56) References Cited

U.S. PATENT DOCUMENTS

| | | | |
|---|---|---|---|
| 2019/0223073 A1* | 7/2019 | Chen | H04W 36/0077 |
| 2019/0387440 A1 | 12/2019 | Yiu et al. | |
| 2020/0077314 A1* | 3/2020 | Hwang | H04W 76/27 |
| 2021/0058834 A1* | 2/2021 | Paladugu | H04W 36/362 |
| 2021/0105681 A1* | 4/2021 | Paladugu | H04W 36/00837 |
| 2021/0377831 A1* | 12/2021 | Yan | H04W 36/00838 |
| 2022/0038976 A1* | 2/2022 | Hwang | H04W 36/0079 |
| 2022/0264401 A1* | 8/2022 | Yan | H04W 24/02 |
| 2022/0361060 A1* | 11/2022 | Wallentin | H04W 36/00837 |
| 2022/0386197 A1* | 12/2022 | Hwang | H04W 36/362 |

FOREIGN PATENT DOCUMENTS

| | | | | |
|---|---|---|---|---|
| CN | 110611580 A | | 12/2019 | |
| EP | 3609231 A1 | | 2/2020 | |
| WO | 2018156696 A1 | | 8/2018 | |
| WO | WO-2021028992 A1 | * | 2/2021 | H04W 36/36 |

OTHER PUBLICATIONS

International Search Report issued in corresponding International Application No. PCT/CN2021/074593, dated Apr. 22, 2021, pp. 1-10.

Extended European Search Report issued in corresponding European Application No. 21753007.0, dated Jun. 15, 2023, pp. 1-8.

* cited by examiner

HANDOVER METHOD AND COMMUNICATION APPARATUS

CROSS-REFERENCE TO RELATED APPLICATIONS

This application is a continuation of International Application No. PCT/CN2021/074593, filed on Feb. 1, 2021, which claims priority to Chinese Patent Application No. 202010093425.7, filed on Feb. 14, 2020. The disclosures of the aforementioned applications are hereby incorporated by reference in their entireties.

BACKGROUND

In a prior handover procedure, a network device indicates, to a terminal device by using a handover message, related information of a target cell to which the terminal device needs to hand over. After the handover message is sent/received, data transmission between the terminal device and the network device is suspended until the terminal device successfully hands over to the target cell, and then the terminal device performs data transmission with the target cell (or a network device to which the target cell belongs). Therefore, in the prior handover procedure, there is a handover interruption latency.

In a communication system such as a new radio (NR) system or a long term evolution (LTE) system, in consideration of some factors, for example, fast attenuation of channel quality, fast movement of the terminal device, blocking of an object, and long duration of measurement and handover preparation, transmission of the handover message fails. In this case, the handover fails. When the handover fails, the terminal device usually needs to perform a reestablishment procedure to restore communication. This may cause long communication interruption time, and affect user experience.

Therefore, how to consider both handover reliability and handover interruption latency reduction is an urgent problem to be resolved.

SUMMARY

A handover method and a communication apparatus is described to improve handover reliability and reduce a handover interruption latency, that is, reduce a communication interruption latency caused by a handover.

According to a first aspect, a handover method is provided. The method is performed by a terminal device, or is performed by a chip or a circuit configured in the terminal device. This is not limited in embodiments described herein.

The method includes: receiving a first message, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0; performing a handover from a source cell to a target cell, where the target cell belongs to the N candidate cells; and maintaining data transmission with the source cell in a process of the handover from the source cell to the target cell.

In other words, the first message is received, where the first message includes the information about the N candidate cells, the N candidate cells include the N1 candidate cells and the N2 candidate cells, the N1 candidate cells include the cell for which no conditional handover CHO execution condition information is configured, the N2 candidate cells include the cell for which the CHO execution condition information is configured, N and N2 are integers greater than 1 or equal to 1, and N1 is an integer greater than 0 or equal to 0. An attempt to hand over from the source cell to the target cell is performed, where the target cell belongs to the N candidate cells. Data transmission is maintained with the source cell in a process of the attempt to hand over from the source cell to the target cell.

Optionally, in the process of the handover from the source cell to the target cell, a connection, for example, a radio resource control (RRC) connection, to the source cell is maintained.

Based on the foregoing technical solution, a handover latency and handover reliability is considered. For example, before the terminal device needs to perform a handover, the terminal device obtains information about a plurality of candidate cells, so that the terminal device selects the target cell from the N candidate cells in response to the terminal device performing the handover. In this manner, a handover success rate is improved, long-time communication interruption is avoided, and user experience is improved. In addition, in the handover process, an RRC connection to and/or data transmission with the source cell are/is maintained. Therefore, data transmission of the terminal device is also ensured in the handover process, and an interruption latency in the handover process is reduced. Therefore, in the foregoing solution, the handover latency and the handover reliability is considered, so that the interruption latency in the handover process is reduced, and the handover reliability is improved, to improve performance of a mobile communication system.

With reference to the first aspect, in at least one embodiment, the maintaining data transmission with the source cell includes: maintaining data transmission with the source cell during running of a timer; and disconnecting data transmission with the source cell in response to the timer stopping.

Optionally, the method further includes: maintaining a connection, for example, the RRC connection, to the source cell during running of the timer; and disconnecting the connection, for example, the RRC connection, to the source cell in response to the timer stopping.

Based on the foregoing technical solution, the terminal device releases the connection to the source cell at an appropriate time point, and stop data transmission with the source cell. In this solution, the terminal device is prevented from maintaining a source connection for a long time after the terminal device communicates with the target cell, to further reduce energy consumption of the terminal device and reduce implementation complexity of the terminal device.

With reference to the first aspect, in at least one embodiment, a moment of starting the timer is one of the following: a moment of receiving the first message, a moment of determining the target cell, a moment of sending, to the source cell, information indicating the target cell, a moment of sending a preamble to the target cell, a moment of receiving a random access response message, a moment of receiving a contention resolution message, a moment of sending an RRC reconfiguration complete message to the target cell, or a moment of sending a second message to the source cell; and the second message is used to indicate the source cell to send an early forwarding transfer message to the target cell, and/or the second message is used to indicate the source cell to forward data to the target cell.

Optionally, the second message includes information about the target cell. For example, the information about the target cell includes identification information of the target cell (for example, a physical cell identifier PCI) of the target cell and frequency information corresponding to the target cell, and/or a cell global identifier (CGI) of the target cell, and/or an index of the target cell).

With reference to the first aspect, in at least one embodiment of the first aspect, before the performing a handover from a source cell to a target cell, the method includes: determining the target cell from the N candidate cells; and the maintaining data transmission with the source cell includes: generating a radio bearer corresponding to the target cell, and maintaining a radio bearer configuration corresponding to the source cell.

For example, the terminal device reestablishes a radio bearer, associate the reestablished radio bearer with the target cell, and maintain a radio bearer configuration corresponding to the source cell.

For another example, the terminal device establishes a radio bearer corresponding to the target cell, and suspends a radio bearer corresponding to the source cell.

Based on the foregoing technical solution, the terminal device correctly performs radio bearer transmission, to improve transmission performance.

With reference to the first aspect, in at least one embodiment, the method further includes: maintaining data transmission with the source cell in response to the handover from the source cell to the target cell failing and no radio link failure occurring in the source cell.

With reference to the first aspect, in at least one embodiment, the method further includes: initiating a reestablishment procedure in response to the radio link failure occurring in the source cell.

With reference to the first aspect, in at least one embodiment, in response to the radio link failure occurring in the source cell, the method further includes: performing cell selection, and in response to a selected cell belonging to the N candidate cells, attempting to hand over to the selected cell; determining whether there is a cell that meets a CHO execution condition in the N2 candidate cells, and in response to the cell that meets the CHO execution condition being determined, attempting to hand over to the determined cell that meets the CHO execution condition; performing cell selection, and in response to a selected cell not belonging to the N candidate cells, initiating a reestablishment procedure; or determining whether there is a cell that meets a CHO execution condition in the N2 candidate cells, and in response to no cell meeting the CHO execution condition in the N2 candidate cells, initiating a reestablishment procedure.

With reference to the first aspect, in at least one embodiment, in response to the handover from the source cell to the target cell failing, the method further includes: performing cell selection, and in response to a selected cell belonging to the N candidate cells, attempting to hand over to the selected cell; determining whether there is a cell that meets a CHO execution condition in the N2 candidate cells, and in response to the cell that meets the CHO execution condition being determined, attempting to hand over to the determined cell that meets the CHO execution condition; performing cell selection, and in response to a cell selected through the cell selection not belonging to the N candidate cells, initiating a reestablishment procedure; or determining whether there is a cell that meets a CHO execution condition in the N2 candidate cells, and in response to there being no cell that meets the CHO execution condition in the N2 candidate cells, initiating a reestablishment procedure.

With reference to the first aspect, in at least one embodiment, the performing a handover from a source cell to a target cell includes: preferentially handing over from the source cell to a first cell, where the first cell belongs to the N1 candidate cells.

Optionally, it is pre-specified, for example, it is pre-specified in a protocol that a priority of the cell for which no CHO execution condition information is configured is higher than that of the cell for which the CHO execution condition information is configured. After the terminal device receives the first message, if the first message includes the cell for which no CHO execution condition information is configured and the cell for which the CHO execution condition information is configured, the terminal device determines that the priority of the cell for which no CHO execution condition information is configured is higher than that of the cell for which the CHO execution condition information is configured.

Based on the foregoing technical solution, the terminal device performs a subsequent handover procedure based on priority information. In response to selecting the target cell, the terminal device first selects, from the N1 candidate cells, a cell to which the terminal device hands over, to reduce complexity and energy consumption caused by determining whether the candidate cell meets the CHO execution condition.

There are many solutions for determining the target cell by the terminal device, which are described in detail in the following embodiments.

With reference to the first aspect, in at least one embodiment, in response to the handover from the source cell to the first cell failing, the method further includes: maintaining data transmission with the source cell in response to no radio link failure occurring in the source cell; attempting to hand over to a cell other than the first cell in the N1 candidate cells; performing cell selection, and in response to a selected cell belonging to the N candidate cells, attempting to hand over to the selected cell; determining whether there is a cell that meets a CHO execution condition in the N2 candidate cells, and in response to the cell that meets the CHO execution condition being determined, attempting to hand over to the determined cell that meets the CHO execution condition; performing cell selection, and in response to a selected cell not belonging to the N candidate cells, initiating a reestablishment procedure; or determining whether there is a cell that meets a CHO execution condition in the N2 candidate cells, and in response to there being no cell that meets the CHO execution condition in the N2 candidate cells, initiating a reestablishment procedure.

Optionally, in response to the handover from the source cell to the first cell failing, the method further includes: maintaining the connection to the source cell, for example, the RRC connection in response to no radio link failure occurring in the source cell.

Based on the foregoing technical solution, the terminal device appropriately performs the handover, to improve overall communication performance.

With reference to the first aspect, in at least one embodiment, before the performing a handover from a source cell to a target cell, the method includes: determining the target cell from the N candidate cells; and the method further includes: sending the second message to the source cell, where the second message is used to indicate to send the early forwarding transfer message to the target cell, and/or the second message is used to indicate to forward the data to the target cell.

The early forwarding transfer message is merely a name for ease of description, and the name does not limit the protection scope of embodiments described herein. For the early forwarding transfer message, refer to descriptions about a message #A in the following embodiments.

According to a second aspect, a handover method is provided. The method is performed by a network device, or is performed by a chip or a circuit configured in the network device. This is not limited in embodiments described herein.

The method includes: sending a first message, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0; maintaining data transmission with a terminal device in a process in which the terminal device hands over from a source cell to a target cell, where the target cell belongs to the N candidate cells.

In other words, the first message is sent, where the first message includes the information about the N candidate cells, the N candidate cells include the N1 candidate cells and the N2 candidate cells, the N1 candidate cells include the cell for which no conditional handover CHO execution condition information is configured, the N2 candidate cells include the cell for which the CHO execution condition information is configured, N and N2 are integers greater than 1 or equal to 1, and N1 is an integer greater than 0 or equal to 0. Information about the target cell is obtained, where the target cell belongs to the N candidate cells. Data transmission with the terminal device in a process in which the terminal device attempts to hand over from the source cell to the target cell.

Optionally, the source cell obtains the information about the target cell from the terminal device, or the source cell obtains the information about the target cell from the target cell. This is not limited herein.

Optionally, in the process of the handover from the source cell to the target cell, a connection to the source cell, for example, an RRC connection is maintained.

Based on the foregoing technical solution, a handover latency and handover reliability is considered. For example, the source cell notifies the terminal device of information about one or more candidate cells before the terminal device needs to perform a handover, so that the terminal device selects the target cell from the N candidate cells in response to the terminal device performing the handover. In this manner, a handover success rate is improved, long-time communication interruption is avoided, and user experience is improved. In addition, in the handover process, an RRC connection to and/or data transmission with the terminal device are/is maintained. Therefore, data transmission of the terminal device is also ensured in the handover process, and an interruption latency in the handover process is reduced. Therefore, in the foregoing solution, the handover latency and the handover reliability is considered, so that the interruption latency in the handover process is reduced, and the handover reliability is improved, to improve performance of a mobile communication system.

With reference to the second aspect, in at least one embodiment, the method further includes: receiving a second message from the terminal device, where the second message is used to indicate to send an early forwarding transfer message to the target cell, and/or the second message is used to indicate to forward data to the target cell.

Optionally, the second message includes the information about the target cell. For example, the information about the target cell includes identification information of the target cell (for example, a PCI of the target cell and frequency information corresponding to the target cell, and/or a cell CGI of the target cell, and/or an index (for example, an index) of the target cell).

With reference to the second aspect, in at least one embodiment, the method further includes: receiving a third message from the target cell, where the third message is used to indicate to send an early forwarding transfer message to the target cell, and/or the third message is used to indicate to forward data to the target cell.

Optionally, the third message includes the information about the target cell. For example, the information about the target cell includes identification information of the target cell (for example, a PCI of the target cell and frequency information corresponding to the target cell, and/or a cell CGI of the target cell, and/or an index (for example, an index) of the target cell).

With reference to the second aspect, in at least one embodiment, the maintaining data transmission with the terminal device includes: maintaining data transmission with the terminal device during running of a timer; and disconnecting data transmission with the terminal device in response to the timer stopping.

Optionally, the method further includes: maintaining a connection, for example, the RRC connection, to the terminal device during running of the timer; and disconnecting the connection, for example, the RRC connection, to the terminal device in response to the timer stopping.

With reference to the second aspect, in at least one embodiment, a moment of starting the timer is one of the following: a moment of sending the first message, a moment of receiving the second message, a moment of receiving the third message, after a handover success message sent by the target cell is received, or a moment of receiving the information about the target cell; the second message is used to indicate to send the early forwarding transfer message to the target cell, and/or the second message is used to indicate to forward the data to the target cell; and the third message is used to indicate to send the early forwarding transfer message to the target cell, and/or the third message is used to indicate to forward the data to the target cell.

According to a third aspect, a handover method is provided. The method is performed by a network device, or is performed by a chip or a circuit configured in the network device. This is not limited in embodiment described herein.

The method includes: A network device to which a source cell belongs sends a first message to a terminal device, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0. A network device to which a target cell belongs sends a third message to the network device to which the source cell belongs, where the target cell belongs to the N candidate cells, the third message is used to indicate to send an early forwarding transfer message to the network device to which the target cell belongs, and/or the third message is used to indicate to forward data to the network device to which the target cell belongs.

Optionally, the third message includes information about the target cell. For example, the information about the target cell includes identification information of the target cell (for example, a PCI of the target cell and frequency information corresponding to the target cell, and/or a cell CGI of the target cell, and/or an index (for example, an index) of the target cell).

Based on the foregoing technical solution, during a handover, the terminal device obtains information about a candidate cell by using a CHO mechanism, so that a handover success rate is improved. In addition, the network device to which the target cell belongs indicates the network device to which the source cell belongs to send the early forwarding transfer message to the network device to which the target cell belongs, and/or the network device to which the target cell belongs indicates the network device to which the source cell belongs to forward the data (for example, uplink and downlink data) to the network device to which the target cell belongs, to improve data transmission reliability.

With reference to the third aspect, in at least one embodiment, that a network device to which a target cell belongs sends a third message to the network device to which the source cell belongs includes: In response to receiving a preamble sent by the terminal device, the network device to which the target cell belongs sends the third message to the network device to which the source cell belongs.

Based on the foregoing technical solution, after receiving the preamble sent by the terminal device, the network device to which the target cell belongs sends the third message to the network device to which the source cell belongs.

With reference to the third aspect, in at least one embodiment, in a process in which the terminal device hands over from the source cell to the target cell, the source cell maintains data transmission with the terminal device.

In other words, in a process in which the terminal device attempts to hand over from the source cell to the target cell, the source cell maintains data transmission with the terminal device.

Optionally, in the process in which the terminal device hands over from the source cell to the target cell, the source cell maintains a connection, for example, an RRC connection, to the terminal device.

According to a fourth aspect, a handover method is provided. The method is performed by a network device and a terminal device, or is performed by a chip or a circuit configured in a device (for example, the network device or the terminal device). This is not limited in embodiments described herein.

The method includes: A network device to which a source cell belongs sends a first message to a terminal device, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0. The terminal device sends a preamble to a network device to which a target cell belongs, where the target cell belongs to the N candidate cells. The network device to which the target cell belongs sends a third message to the network device to which the source cell belongs, where the third message is used to indicate to send an early forwarding transfer message to the network device to which the target cell belongs, and/or the third message is used to indicate to forward data to the network device to which the target cell belongs.

Based on the foregoing technical solution, during a handover, the terminal device obtains information about a candidate cell by using a CHO mechanism, so that a handover success rate is improved. In addition, the terminal device sends the preamble to the network device to which the target cell belongs (for example, after determining the target cell, the terminal device sends the preamble to the network device to which the target cell belongs). After receiving the preamble sent by the terminal device, the network device to which the target cell belongs indicates the network device to which the source cell belongs to send the early forwarding transfer message to the network device to which the target cell belongs, and/or indicates the network device to which the source cell belongs to forward the data (for example, uplink and downlink data) to the network device to which the target cell belongs, to improve data transmission reliability.

Optionally, the third message includes information about the target cell. For example, the information about the target cell includes identification information of the target cell (for example, a PCI of the target cell and frequency information corresponding to the target cell, and/or a cell CGI of the target cell, and/or an index (for example, an index) of the target cell).

With reference to the fourth aspect, in at least one embodiment, the network device to which the target cell belongs receives the early forwarding transfer message from the network device to which the source cell belongs, and/or the network device to which the target cell belongs receives the data from the network device to which the source cell belongs.

With reference to the fourth aspect, in at least one embodiment, the method further includes: In a process in which the terminal device hands over from the source cell to the target cell, the terminal device maintains data transmission with the source cell.

Optionally, in the process in which the terminal device hands over from the source cell to the target cell, the terminal device maintains a connection, for example, an RRC connection, to the source cell.

With reference to the first aspect to the fourth aspect, in at least one embodiment, information about the N2 candidate cells includes CHO configuration information of the N2 candidate cells, and the CHO configuration information of the N2 candidate cells includes the CHO execution condition information and a parameter corresponding to each of the N2 candidate cells.

Optionally, the CHO execution condition information is shared by one or more candidate cells. In other words, in response to there being a plurality of candidate cells, the plurality of candidate cells corresponding to same CHO execution condition information. The CHO execution condition information is alternatively cell-level. In other words, in response to there being a plurality of candidate cells, the plurality of candidate cells have respective corresponding CHO execution condition information.

With reference to the first aspect to the fourth aspect, in at least one embodiment, the parameter corresponding to the candidate cell includes one or more of the following: a cell radio network temporary identifier C-RNTI allocated by the candidate cell to the terminal device, random access channel RACH resource information for accessing the candidate cell, index information corresponding to the candidate cell, a cell global identifier CGI of the candidate cell, a physical cell identifier PCI of the candidate cell, frequency information corresponding to the candidate cell, a physical layer configuration parameter, a media access control MAC layer configuration parameter, a radio link control RLC layer configuration parameter, a packet data convergence protocol PDCP layer configuration parameter, a service data adaptation protocol SDAP layer configuration parameter, an RRC layer configuration parameter, or bearer configuration information.

With reference to the first aspect to the fourth aspect, in at least one embodiment, the CHO configuration information of the N2 candidate cells is released in one of the following cases: in response to the reestablishment procedure being triggered; in response to the reestablishment procedure succeeding; in response to the reestablishment procedure failing; or in response to the handover from the source cell to the target cell failing and the terminal device continuing to stay in the source cell.

According to a fifth aspect, a handover method is provided. The method is performed by a network device, or is performed by a chip or a circuit configured in the network device. This is not limited in embodiments described herein. The method includes: receiving a preamble sent by a terminal device; and sending a third message to a source cell of the terminal device, where the third message is used to indicate to send an early forwarding transfer message to a target cell, and/or the third message is used to indicate to forward data to the target cell.

Optionally, the third message includes information about the target cell. For example, the information about the target cell includes identification information of the target cell (for example, a PCI of the target cell and frequency information corresponding to the target cell, and/or a cell CGI of the target cell, and/or an index (for example, an index) of the target cell).

With reference to the fifth aspect, in at least one embodiment, the method further includes: receiving the early forwarding transfer message from the source cell, and/or receiving the data from the source cell.

According to a sixth aspect, a handover method is provided. The method is performed by a terminal device, or is performed by a chip or a circuit configured in the terminal device. This is not limited in embodiments described herein. The method includes: receiving a first message, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0; and in a handover case, preferentially handing over from a source cell to a first cell, where the first cell belongs to the N1 candidate cells.

With reference to the sixth aspect, in at least one embodiment, data transmission with the source cell is maintained in response to the handover from the source cell to the first cell failing and no radio link failure occurring in the source cell.

Optionally, a connection, for example, an RRC connection, to the source cell is maintained in response to the handover from the source cell to the first cell failing and no radio link failure occurring in the source cell.

With reference to the sixth aspect, in at least one embodiment, a reestablishment procedure is initiated in response to the radio link failure occurring in the source cell.

With reference to the sixth aspect, in at least one embodiment, in response to the radio link failure occurring in the source cell, the method further includes: performing cell selection, and in response to a selected cell belonging to the N candidate cells, attempting to hand over to the selected cell; determining whether there is a cell that meets a CHO execution condition in the N2 candidate cells, and in response to the cell that meets the CHO execution condition being determined, attempting to hand over to the determined cell that meets the CHO execution condition; performing cell selection, and in response to a selected cell not belonging to the N candidate cells, initiating a reestablishment procedure; or determining whether there is a cell that meets a CHO execution condition in the N2 candidate cells, and in response to there being no cell that meets the CHO execution condition in the N2 candidate cells, initiating a reestablishment procedure.

With reference to the sixth aspect, in at least one embodiment, in response to the handover from the source cell to the first cell failing, the method further includes: attempting to hand over to a cell other than the first cell in the N1 candidate cells; performing cell selection, and in response to a selected cell belonging to the N candidate cells, attempting to hand over to the selected cell; determining whether there is a cell that meets a CHO execution condition in the N2 candidate cells, and in response to the cell that meets the CHO execution condition being determined, attempting to hand over to the determined cell that meets the CHO execution condition; performing cell selection, and in response to a selected cell not belonging to the N candidate cells, initiating a reestablishment procedure; or determining whether there is a cell that meets a CHO execution condition in the N2 candidate cells, and in response to there being no cell that meets the CHO execution condition in the N2 candidate cells, initiating a reestablishment procedure.

With reference to the sixth aspect, in at least one embodiment, information about the N2 candidate cells includes CHO configuration information of the N2 candidate cells, and the CHO configuration information of the N2 candidate cells includes the CHO execution condition information and a parameter corresponding to each of the N2 candidate cells.

With reference to the sixth aspect, in at least one embodiment, the parameter corresponding to the candidate cell includes one or more of the following: a cell radio network temporary identifier C-RNTI allocated by the candidate cell to the terminal device, random access channel RACH resource information for accessing the candidate cell, index information corresponding to the candidate cell, a cell global identifier CGI of the candidate cell, a physical cell identifier PCI of the candidate cell, frequency information corresponding to the candidate cell, a physical layer configuration parameter, a media access control MAC layer configuration parameter, a radio link control RLC layer configuration parameter, a packet data convergence protocol PDCP layer configuration parameter, a service data adaptation protocol SDAP layer configuration parameter, an RRC layer configuration parameter, or bearer configuration information.

According to a seventh aspect, a communication apparatus is provided. The apparatus is configured to perform the method in at least one embodiment. Specifically, the apparatus includes units configured to perform the method in at least one embodiment.

According to an eighth aspect, another communication apparatus is provided, including a processor. The processor is coupled to a memory, and is configured to execute instructions in the memory, to implement the method in at least one embodiment. In at least one embodiment, the apparatus further includes the memory. In at least one embodiment, the apparatus further includes a communication interface, and the processor is coupled to the communication interface.

In at least one embodiment, the communication apparatus is a terminal device, a chip or a circuit configured in the terminal device, or a device including the terminal device.

In at least one embodiment, the communication apparatus is a network device, a chip or a circuit configured in the network device, or a device including the network device.

In at least one embodiment, the apparatus is a terminal device or a device including the terminal device. In response to the apparatus is the terminal device or the device including the terminal device, the communication interface is a transceiver or an input/output interface. Optionally, the transceiver is a transceiver circuit.

In at least one embodiment, the apparatus is a chip configured in the terminal device. In response to the apparatus being the chip configured in the terminal device, the communication interface is an input/output interface, an interface circuit, an output circuit, an input circuit, a pin, a related circuit, or the like. The processor alternatively is embodied as a processing circuit or a logic circuit.

In at least one embodiment, the apparatus is a network device (for example, a network device to which a source cell belongs or a network device to which a target cell belongs) or a device including the network device. In response to the apparatus being the network device or the device including the network device, the communication interface is a transceiver or an input/output interface. Optionally, the transceiver is a transceiver circuit.

In yet another implementation, the apparatus is a chip configured in the network device (for example, a network device to which a source cell belongs or a network device to which a target cell belongs). In response to the apparatus being the chip configured in the network device, the communication interface is an input/output interface, an interface circuit, an output circuit, an input circuit, a pin, a related circuit, or the like. The processor alternatively is embodied as a processing circuit or a logic circuit.

According to a ninth aspect, a computer-readable storage medium is provided. The computer-readable storage medium stores a computer program. In response to the computer program being executed by a communication apparatus, the communication apparatus is enabled to perform the method in at least one embodiment.

According to a tenth aspect, a computer program product including instructions is provided. In response to the instructions being executed by a computer, a communication apparatus is enabled to implement the method in at least one embodiment.

According to an eleventh aspect, a communication system is provided, including the source cell (or the network device to which the source cell belongs) and the terminal device described above.

According to a twelfth aspect, a communication system is provided, including the source cell (or the network device to which the source cell belongs) and the target cell (or the network device to which the target cell belongs) described above.

According to a thirteenth aspect, a communication system is provided, including the source cell (or the network device to which the source cell belongs), the target cell (or the network device to which the target cell belongs), and the terminal device described above.

DESCRIPTION OF EMBODIMENTS

The following describes the technical solutions according to at least one embodiment with reference to the accompanying drawings.

The technical solutions according to at least one embodiment is applied to various communication systems, for example, a 5th generation (5G) system, a new radio (NR) system, a long term evolution (LTE) system, an LTE frequency division duplex (FDD) system, an LTE time division duplex (TDD) system, a universal mobile telecommunications system (UMTS), or a future communication system.

For ease of understanding embodiments described herein, a communication system is first described in detail with reference to FIG. 1 to FIG. 3.

Figure 1:
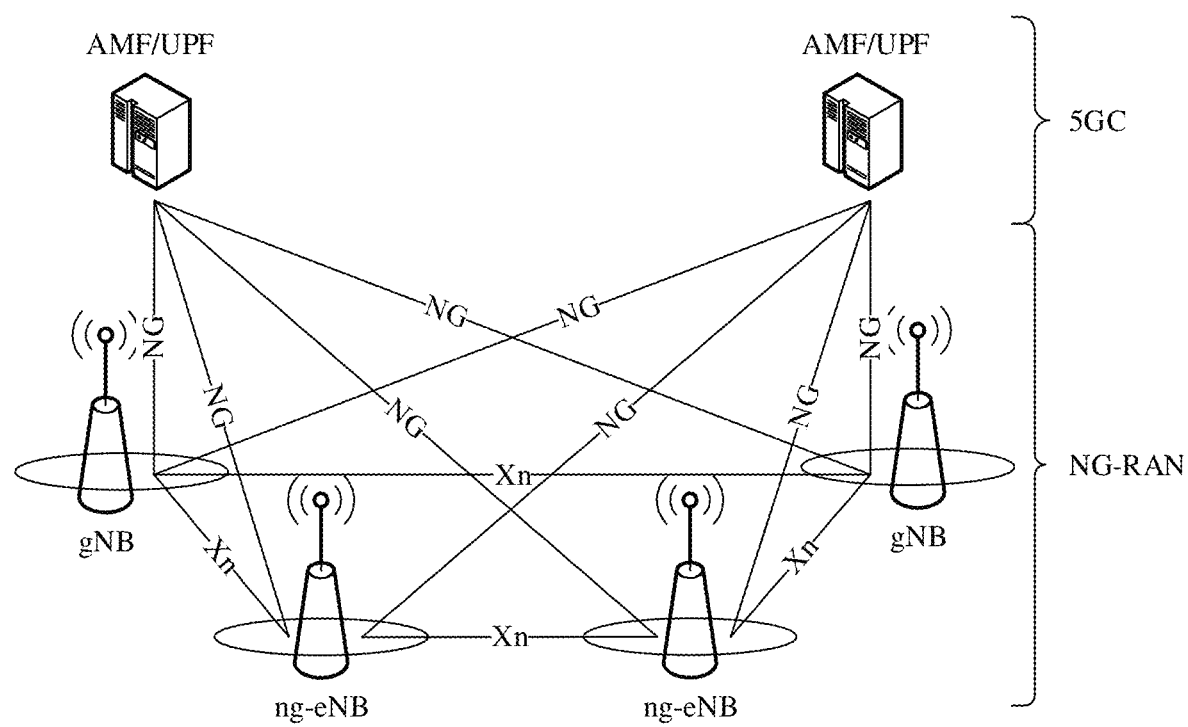
FIG. 1 to FIG. 3 each are a schematic diagram of a communication system according to at least one embodiment.

FIG. 1 is a schematic diagram of a communication system according to at least one embodiment.

FIG. 1 is a schematic network architecture of an NR system. The network architecture includes, for example, the following devices: a core network device, an access network device, and a terminal device.

1. Core Network Device

As shown in FIG. 1, the core network device is, for example, a 5th generation core network (5GC). The core network device indicates a device in a core network (CN) that provides service support for the terminal device.

For example, the core network device includes, for example, one or more of the following: an access and mobility management function (AMF) entity, a session management function (SMF) entity, or a user plane function (UPF) entity.

The AMF entity is also referred to as, for example, an AMF network element or an AMF function entity. The AMF entity is configured to being responsible for access management, mobility management, and the like of the terminal device.

The SMF entity is also referred to as, for example, an SMF network element or an SMF function entity. The SMF entity is responsible for session management (for example, session establishment of a user), internet protocol (IP) address allocation and management of UE, and the like.

The UPF entity is also referred to as, for example, an UPF network element or an UPF function entity. The UPF entity is a user plane function entity, namely, a user plane gateway, and is configured to: route and forward a packet, process quality of service (QoS) of user plane data, or the like. User data is sent to an external network, for example, a data network (DN), through the UPF entity.

The AMF entity, the SMF entity, and the UPF entity are understood as network elements configured to implement different functions in the core network, for example, forms a network slice based on a requirement. These core network elements is independent devices, or is integrated into a same device to implement different functions. This is not limited in embodiment described herein.

The foregoing names are merely used to distinguish between different functions, and do not mean that the network elements are independent physical devices. Specific forms of the foregoing network elements are not limited in embodiments described herein. For example, the network elements are integrated into a same physical device, or is different physical devices. In addition, the foregoing names are merely used to distinguish between different functions, and do not constitute any limitation on embodiments described herein. Embodiments described herein do not exclude a possibility of using another name in a 5G network and another future network. For example, in a 6G network, terms in 5G are still used for some or all of the foregoing network elements, or other names is used. This is uniformly described herein, and details are not described below again.

2. Access Network Device

As shown in FIG. 1, the access network device is, for example, a next generation radio access network (NG-RAN).

An access network (AN) provides a network access function for an authorized user in a specific area, and uses transmission tunnels with different quality based on user levels, service requirements, and the like. Different access networks use different access technologies. There is, for example, two types of radio access technologies: a 3rd generation partnership project (3GPP) access technology and a non-3rd generation partnership project (non-3GPP) access technology. The 3GPP access technology is an access technology that conforms to a 3GPP standard specification, and an access network using the 3GPP access technology is referred to as a radio access network (RAN). An access network device in a 5G system is referred to as, for example, a next generation NodeB (gNB). The non-3GPP access technology is an access technology that does not conform to the 3GPP standard specification, for example, an air interface technology represented by a Wi-Fi access point (AP).

An access network that implements a network access function based on a radio communication technology is referred to as a radio access network (RAN), and a 5G radio access network in 3GPP is referred to as an NG-RAN. The radio access network manages radio resources, provide an access service for a terminal, and further complete forwarding of a control signal and user data between the terminal and the core network.

The access network device is, for example, a base station, such as a gNB or a next generation (NG) evolved NodeB (eNB or eNodeB) (ng-eNB). Alternatively, the access network device is another device that has a wireless transceiver function. Alternatively, the access network device includes a centralized unit (CU) node and a distributed unit (DU) node. A specific technology and a specific device form used for the access network device are not limited in embodiments of described herein.

For example, the CU implements some functions of the gNB, and the DU implements some functions of the gNB.

The CU is responsible for processing a non-real-time protocol and service. For example, the CU implements functions of a radio resource control (RRC) layer, a service data adaptation protocol (SDAP) layer, and a packet data convergence protocol (PDCP) layer.

The DU is responsible for processing a physical layer protocol and a real-time service. For example, the DU implements functions of a radio link control (RLC) layer, a media access control (MAC) layer, and a physical (physical, PHY) layer. Alternatively, the 5G access network device is another device that has a wireless transceiver function.

As shown in FIG. 1, the access network device and the core network device is connected through a communication interface. In the communication system shown in FIG. 1, the interface between the access network device and the core network device is referred to as an NG interface. Access network devices is also connected through a communication interface. In the communication system shown in FIG. 1, the interface between the access network devices is referred to as an Xn interface.

Names of interfaces between the devices in FIG. 1 are merely examples, and the interfaces have other names during specific implementation. This is not specifically limited in embodiments described herein. In addition, names of messages (or signaling) transmitted between the foregoing devices are merely examples, and do not constitute any limitation on functions of the messages.

3. Terminal Device

The terminal device is also referred to as, for example, user equipment (UE), a mobile station (MS), a mobile terminal (MT), or the like, and is a device that provides voice and/or data connectivity for a user. For example, the terminal device is a handheld device or a vehicle-mounted device that has a wireless connection function.

For example, the terminal device is a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. This is not limited in embodiments of described herein.

FIG. 1 shows the core network device and the access network device that are used as an example. This is not limited in embodiments of described herein. For example, the communication system further includes one or more terminal devices. For another example, the communication system further includes more or fewer access network devices.

Figure 2:
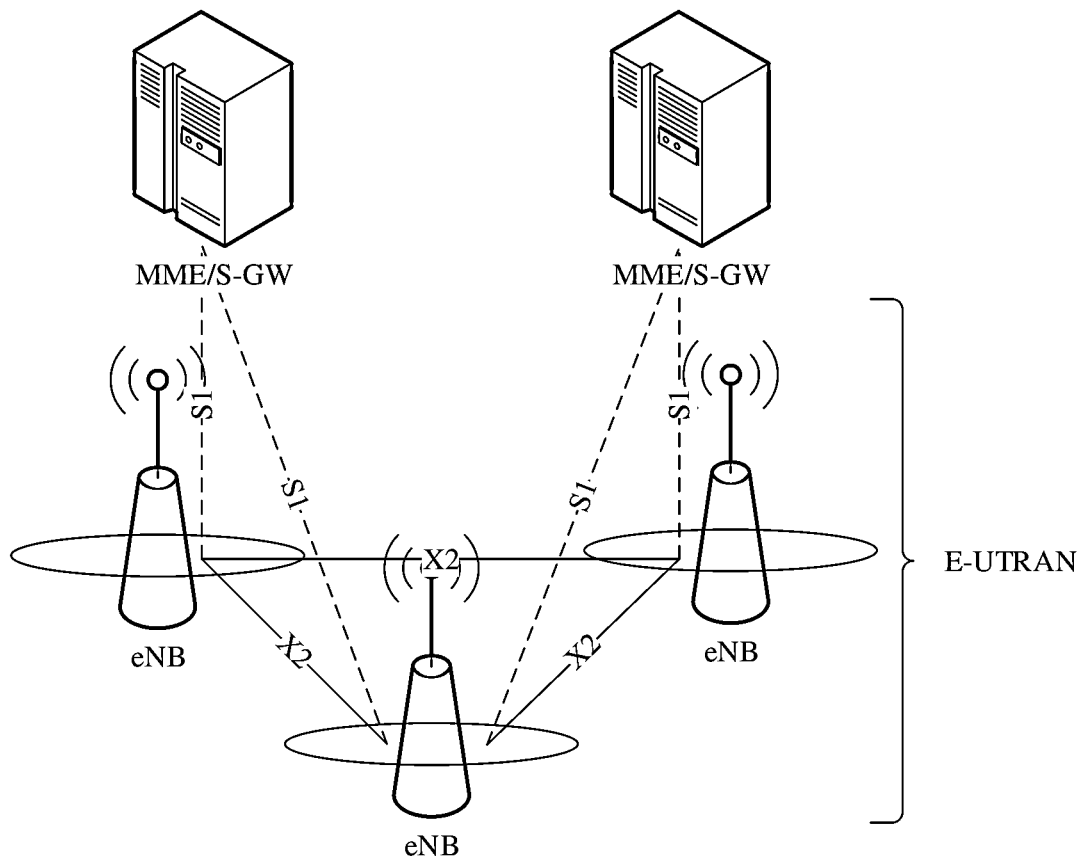

FIG. 2 is another schematic diagram of a communication system according to at least one embodiment.

FIG. 2 is a schematic network architecture of an LTE system. The network architecture includes, for example, the following devices: a core network device, an access network device, and a terminal device.

As shown in FIG. 2, the core network device includes, for example, one or more of the following: a serving gateway (S-GW) entity, a mobility management entity (MME), or a packet data network gateway (P-GW).

The S-GW entity is also referred to as, for example, an S-GW network element or an S-GW function entity. The S-GW entity is responsible for functions such as user plane processing, data packet routing and forwarding.

The MME is responsible for functions such as mobility management, bearer management, user authentication, and selection of an S-GW and a P-GW.

The P-GW entity is also referred to as, for example, a P-GW network element or a P-GW function entity.

The S-GW entity and the P-GW entity are understood as network elements configured to implement different functions in a core network, for example, form a network slice based on a requirement. These core network elements are independent devices, or is integrated into a same device to implement different functions. This is not limited in embodiments described herein.

The foregoing names are merely used to distinguish between different functions, and do not mean that the network elements are independent physical devices. Specific forms of the foregoing network elements are not limited in embodiments described herein. For example, the network elements is integrated into a same physical device, or is different physical devices. In addition, the foregoing names are merely used to distinguish between different functions, and do not constitute any limitation on embodiments described herein. Embodiments described herein do not exclude a possibility of using another name in a 5G network and another future network. For example, in a 6G network, terms in 5G is still for some or all of the foregoing network elements, or other names is used. This is uniformly described herein, and details are not described below again.

As shown in FIG. 2, the access network device is, for example, an access network device in an evolved universal terrestrial radio access network (E-UTRAN), for example, an access network device in a 4th generation (4G) access network. For example, the access network device is, for example, a NodeB, an evolved NodeB (eNB, or eNodeB).

For the terminal device, refer to the foregoing descriptions. Details are not described herein again.

As shown in FIG. 2, the access network device and the core network device is connected through a communication interface. In the communication system shown in FIG. 2, the interface between the access network device and the core network device is referred to as an S1 interface. Access network devices are also connected through a communication interface. In the communication system shown in FIG. 2, the interface between the access network devices is referred to as X2 interface.

Names of interfaces between the devices in FIG. 2 are merely examples, and the interfaces have other names during specific implementation. This is not specifically limited in embodiments described herein. In addition, names of messages (or signaling) transmitted between the foregoing devices are merely examples, and do not constitute any limitation on functions of the messages.

Figure 3:
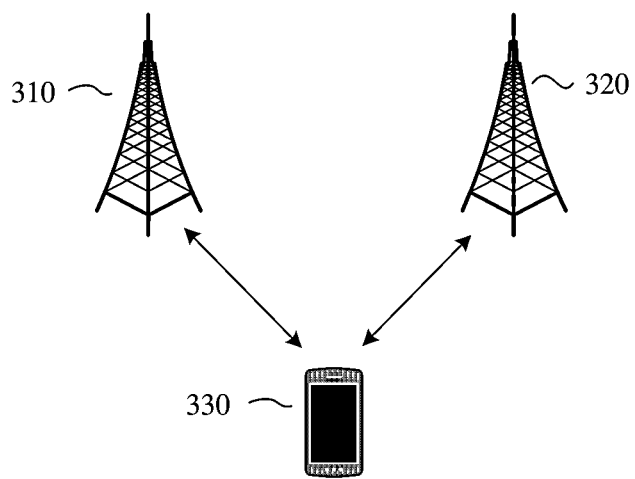

FIG. 3 is still another schematic diagram of a communication system according to at least one embodiment.

As shown in FIG. 3, the communication system includes at least two network devices, for example, a network device 310 and a network device 320 shown in FIG. 3. The communication system further includes at least one terminal device, for example, a terminal device 330 shown in FIG. 3. The terminal device 330 is mobile or fixed. The network device 310 and the network device 320 are devices that communicates with the terminal device 330 through a radio link, for example, a base station or a base station controller, or the access network device described in FIG. 1 or FIG. 2. Each network device provides communication coverage for a particular geographic area, and communicates with a terminal device within the coverage (a cell).

FIG. 3 shows two network devices and one terminal device that are used as an example. However, this does not constitute any limitation on embodiments described herein. Optionally, the communication system includes more network devices, and another quantity of terminal devices is included within coverage of each network device. Optionally, the communication system further includes one or more core network devices. This is not limited in embodiments of described herein.

The communication systems to which at least one embodiment described herein is applicable with reference to FIG. 1 to FIG. 3 are merely examples for description, and the communication systems to which this application is applicable are not limited thereto. For example, the communication system includes another quantity of access network devices and another quantity of terminal devices.

For ease of understanding of embodiments described herein, the following first briefly describes several terms.

1. Cell: The cell is described by a higher layer from the perspective of resource management, mobility management, or a service unit. Coverage of each network device is divided into one or more cells. In addition, each cell corresponds to one or more frequencies, in other words, each cell is considered as an area formed by coverage of the one or more frequencies.

The cell is an area within coverage of a wireless network of the network device. In at least one embodiment, different cells corresponds to a same network device or different network devices. For example, a network device to which a cell #1 belongs and a network device to which a cell #2 belongs is different network devices, for example, base stations. In other words, the cell #1 and the cell #2 is managed by different base stations. Alternatively, for another example, the network device that manages the cell #1 and the network device that manages the cell #2 is different radio frequency processing units of a same base station, for example, radio remote units (RRUs). In other words, the cell #1 and the cell #2 is managed by a same base station and have a same baseband processing unit and a same intermediate frequency processing unit, but have different radio frequency processing units. Alternatively, for another example, the network device to which the cell #1 belongs and the network device to which the cell #2 belongs is a same network device, for example, a base station. In other words, the cell #1 and the cell #2 is managed by a same base station. In this case, it is considered that the cell #1 and the cell #2 are co-sited. This is not particularly limited in embodiments described herein.

2. Cell selection: In some cases, for example, in response to a terminal device being powered on or enters coverage from a coverage hole, the terminal device searches for frequency bands allowed by a public land mobile network (PLMN), and selects an appropriate cell to camp on.

In an implementation, the terminal device determines, according to a criterion S, a cell on which the terminal device camps. The criterion S is, for example, that a received power in cell search is greater than 0 decibel (dB), and received signal quality in the cell search is greater than 0 dB. The received power in the cell search is determined based on a reference signal received power (RSRP) value of a found or measured cell, a minimum receive level of the cell, a minimum receive level offset of the cell, and the like. The received signal quality in the cell search is determined based on a reference signal received quality (RSRQ) value, minimum received signal quality, and a minimum received signal received quality offset of the found or measured cell. For specific content of the criterion S, refer to an NR protocol. For brevity, details are not described herein.

3. Handover (HO): In a wireless communication system, in response to a terminal device moving from a cell to another cell or approaching another cell, a handover needs to be performed to ensure that communication of the terminal device is not interrupted.

In at least one embodiment, a source cell indicates a cell that provides a service for the terminal device before the handover, and a target cell indicates a cell that provides a service for the terminal device after the handover.

The handover is an intra-base-station handover or an inter-base-station handover. The intra-base-station handover means that a source cell and a target cell belong to a same network device (for example, a base station). The source cell and the target cell is a same cell or different cells. The inter-base-station handover means that a source cell and a target cell belong to different network devices (for example, base stations). This is not limited in embodiments described herein.

The cell is coverage of the network device, the source cell corresponds to a source network device (for example, a source base station), and the target cell corresponds to a target network device (for example, a target base station).

The source cell and the target cell belong to a same network device (for example, a base station), or the source cell and the target cell do not belong to a same network device. This is not limited.

For the source cell, the target cell, the source network device, and the target network device, refer to the foregoing descriptions. Details are not described below again.

In a prior handover procedure, mobility management of a terminal device is controlled by a network device. To be specific, the network device sends a handover message to indicate a specific cell to which the terminal device hands over and information used for the handover. For example, a source network device sends a handover message to the terminal device, to control the terminal device to hand over from a source cell to a target cell. The handover message is an RRC message. For example, in an LTE system, the RRC message is an RRC connection reconfiguration message that carries a mobility control information element (mobility control info). For another example, in an NR system, the RRC message is an RRC reconfiguration message that carries a synchronization reconfiguration information element (reconfiguration with sync). The handover message includes a parameter that is used for accessing the target cell and that is configured by a target network device (namely, a network device to which the target cell belongs) for the terminal device, for example, include information about the target cell (for example, a physical cell identifier (physical cell identifier, PCI) of the target cell, frequency information corresponding to the target cell, and a cell radio network temporary identifier (C-RNTI) allocated by the target network device to the terminal device), random access channel (RACH) resource information used for accessing the target cell (for example, dedicated RACH resource information and/or common RACH resource information), and the like. After receiving the handover message, the terminal device attempts to hand over to the target network device based on content included in the handover message. For example, the terminal device initiates a random access procedure to the target network device. A beam characteristic is introduced in NR, and the target network device further considers the beam characteristic in response to configuring the RACH resource information used for accessing the target cell. For example, in response to configuring the RACH resource information, the target network device configures, for a beam (for example, a synchronization signal block (SSB) or a channel state information reference signal (CSI-RS)) that belongs to the target cell, a RACH resource associated with the beam.

The handover message and the RRC message used to indicate the handover are described from different perspectives. The handover message is described from the perspective of a function, and is intended to indicate that the message is used to indicate the terminal device to perform the handover. The RRC message is described from the perspective of a message type, and is intended to indicate that the message is higher layer signaling. The RRC reconfiguration message is an example of the RRC message. In other words, the handover message is delivered to the terminal device by using higher layer signaling.

The foregoing enumerates different RRC messages, for example, the RRC connection reconfiguration message in LTE and the RRC reconfiguration message in NR. These messages are merely examples for ease of understanding, and does not constitute any limitation on embodiments described herein. A specific name of the RRC message used to indicate the terminal device to initiate a handover procedure is not limited in embodiments described herein.

The target cell is named for ease of distinguishing from another cell, and does not constitute any limitation on embodiments described herein. Embodiments described herein do not exclude a possibility that another name is defined in a future protocol to express a same or similar meaning.

In the prior handover procedure, in consideration of some factors, for example, fast attenuation of channel quality, fast movement of the terminal device, blocking of an object, and long duration of measurement and handover preparation, transmission of the handover message fails. In this case, the handover fails. In addition, after the handover message is sent/received, data transmission between the terminal device and the network device is suspended until the terminal device successfully hands over to the target cell, and then the terminal device performs data transmission with the target cell (or the target network device). Therefore, in the prior handover procedure, there is a handover interruption latency. In addition, if the handover fails, the terminal device needs to perform a reestablishment procedure to restore communication. This causes long communication interruption time, and affect user experience.

In view of this, at least one embodiment provides a method that handover reliability and handover latency reduction is considered, and performance of a communication system is also improved.

The following describes in detail embodiments with reference to the accompanying drawings.

Figure 4:
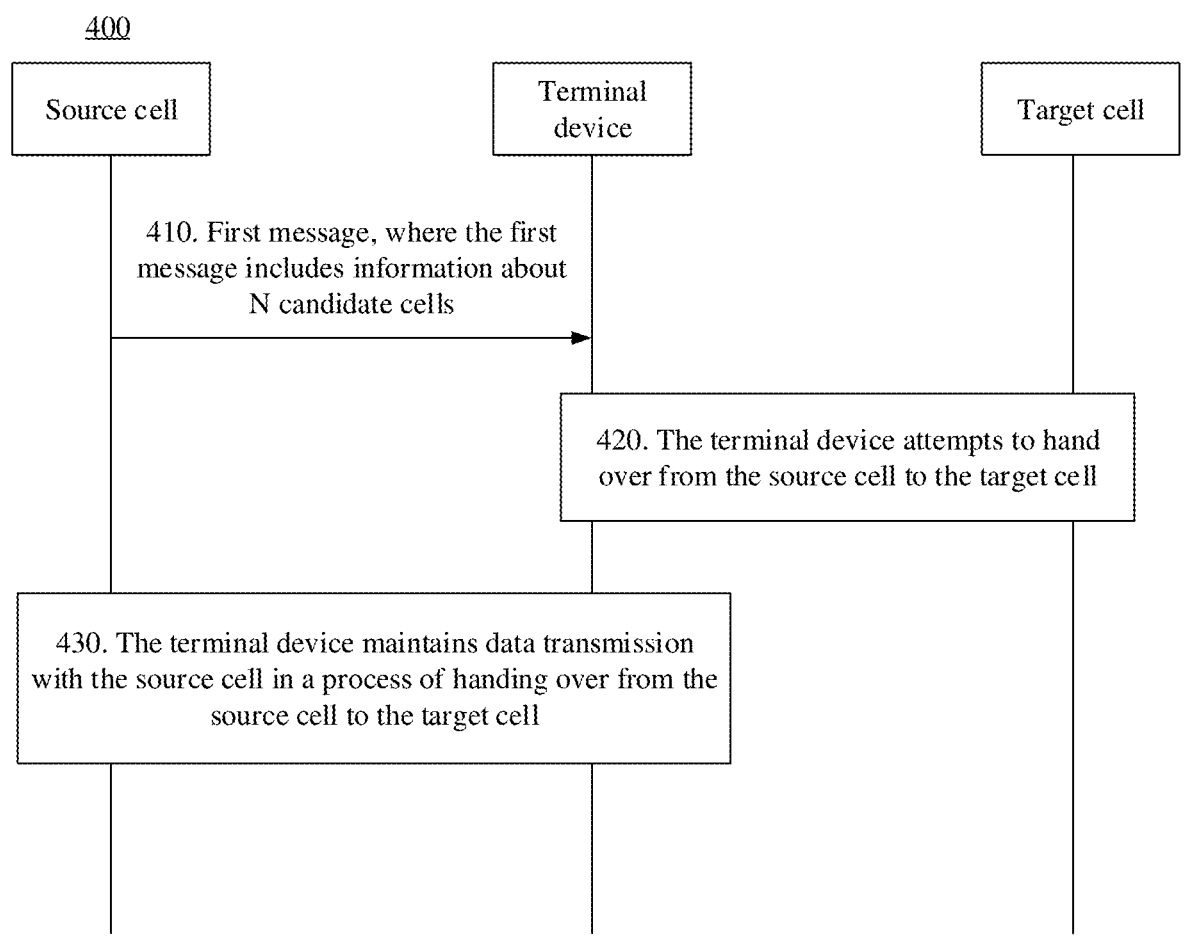
FIG. 4 is a schematic diagram of a handover method according to at least one embodiment.

FIG. 4 is a schematic diagram of interaction of a handover method 400 according to at least one embodiment. The method 400 includes the following steps.

410. A terminal device receives a first message, where the first message includes information about N candidate cells. N is an integer greater than 1 or equal to 1.

For example, the first message is delivered to the terminal device by using higher layer signaling. For example, the first message is an RRC reconfiguration (RRC Reconfiguration, RRC reconfig) message.

Before a handover, the terminal device obtains information about one or more candidate cells. In other words, the terminal device obtains the information about the N candidate cells in advance, so that the terminal device selects a target cell from the N candidate cells in response to a handover being actually used. In this manner, a handover success rate is improved, long-time communication interruption is avoided, and user experience is improved.

For example, in response to signal quality of a source cell being good, a source network device provides the information about the one or more candidate cells for the terminal device. For example, the signal quality of the source cell is determined based on one or more of the following: a reference signal received power (RSRP), reference signal received quality (RSRQ), and a signal to interference plus noise ratio (SINR). Information that indicates communication quality is used in embodiments described herein.

In at least one embodiment, the terminal device obtains information about a candidate cell by using a conditional handover (CHO) mechanism. Handover mechanisms that improve the handover success rate are applicable to at least one embodiment.

Optionally, the N candidate cells include N1 candidate cells and N2 candidate cells. The N1 candidate cells include a cell for which no CHO execution condition information is configured, and the N2 candidate cells include a cell for which the CHO execution condition information is configured. N1 and N2 is integers greater than 0 or equal to 0.

For example, in the N candidate cells, some candidate cells are cells for which no CHO execution condition information is configured, and the other some candidate cells are cells for which the CHO execution condition information is configured. For another example, the CHO execution condition information is configured for the N candidate cells. For another example, no CHO execution condition information is configured for the N candidate cells.

For brevity, in the following, the cell for which no CHO execution condition information is configured is referred to as a first-type candidate cell, and the cell for which the CHO execution condition information is configured is referred to as a second-type candidate cell.

Optionally, for the second-type candidate cell, the information about the candidate cell includes CHO configuration information of the candidate cell. In other words, the information about the candidate cell includes the CHO execution condition information (also referred to as CHO trigger condition information) and a parameter corresponding to the candidate cell.

The following describes the CHO execution condition information and the parameter corresponding to the candidate cell in detail with reference to the CHO mechanism.

In response to the terminal device performing a handover (for example, the signal quality of the source cell becomes poorer, where the signal quality includes one or more of the following: the RSRP, the RSRQ, and the SINR), the terminal device hands over from the source cell to the target cell. The target cell belongs to the N candidate cells.

420. The terminal device attempts to hand over from the source cell to the target cell (or the terminal device attempts a handover from the source cell to the target cell, in other words, the terminal device performs a handover from the source cell to the target cell).

The target cell is a cell for which the CHO execution condition information is configured, or the target cell is a cell for which no CHO execution condition information is configured.

After receiving the first message, the terminal device determines the target cell from the N candidate cells, and perform the handover. In step 420, that the terminal device attempts to hand over from the source cell to the target cell does not necessarily mean that the terminal device is able to successfully hand over to the target cell, in other words, the terminal device successfully accesses the target cell. In step 420, that the terminal device attempts to hand over from the source cell to the target cell indicates that the terminal device attempts to hand over to or attempts to access the target cell after determining the target cell to which the terminal device is able to hand over.

How the terminal device determines the target cell from the candidate cells is described below with reference to content in the fourth aspect.

Optionally, after determining the target cell, the terminal device sends a second message to the source cell (or the source network device).

For example, the second message is an RRC message, a layer 2 message (for example, a media access control element (CE) (MAC CE) or a PDCP control protocol data unit (PDU)), or a physical layer message. This is not limited.

After determining the target cell, the terminal device indicates information about the target cell to the source cell. For example, the second message includes the information about the target cell.

For example, the information about the target cell includes identification information of the target cell (for example, a physical cell identifier (PCI) of the target cell and frequency information corresponding to the target cell, and/or a cell global identifier (CGI) of the target cell, and/or an index (for example, an index) of the target cell).

For example, the second message is further used to indicate the source cell (or the source network device) to send a message #A to the target cell (or a target network device). The source cell sends the message #A to the target cell based on the second message.

The message #A is merely a name given without loss of generality, and the name does not limit the protection scope of embodiments described herein. For example, the message #A is a newly defined message, for example, an early forwarding transfer (early forwarding transfer) message; or the message #A reuses an existing message, for example, a sequence number (SN) status transfer (SN status transfer) message. Specific content of the message #A is described in detail below.

For example, the second message is further used to indicate the source cell to forward data to the target cell. The source cell forwards the data to the target cell based on the second message.

A type of the data forwarded by the source cell to the target cell is not limited. For example, the source cell forwards downlink data to the target cell, such as a downlink (downlink, DL) PDCP service data unit (service data unit, SDU) (DL PDCP SDU(s)). For another example, the source cell forwards uplink data and downlink data to the target cell. For another example, the source cell forwards uplink data to the target cell.

430. The terminal device maintains data transmission with the source cell in a process of attempting to hand over from the source cell to the target cell.

The terminal device maintains data transmission with the source cell (or the source network device) after determining the target cell to which the terminal device is to hand over, or in the process of attempting to hand over to the target cell. Therefore, data transmission of the terminal device is also ensured in the handover process, an interruption latency in the handover process is reduced, and performance of a communication system and user experience are improved.

For example, the process of attempting to hand over from the source cell to the target cell indicates a time period from a time point at which the terminal device determines the target cell to a time point at which the terminal device successfully hands over to (or successfully accesses) the target cell. Alternatively, the process of attempting to hand over from the source cell to the target cell indicates a time period from a time point at which the terminal device starts to perform a random access procedure with the target cell (for example, the terminal device sends a preamble to the target cell) to a time point at which the random access procedure is completed (for example, the random access procedure succeeds or the random access procedure fails). Alternatively, the process of attempting to hand over from the source cell to the target cell indicates a handover execution phase described in a method 500. Alternatively, the process of attempting to hand over from the source cell to the target cell includes a handover execution phase and an execution completion phase described in a method 500.

After the handover succeeds (for example, the terminal device successfully accesses the target cell, the RACH procedure between the terminal device and the target cell succeeds, or the terminal device sends an RRC reconfiguration complete message to the target cell), whether the terminal device needs to maintain data transmission with the source cell is not limited in embodiments described herein. For example, after the handover succeeds, the terminal device maintains data transmission with the source cell, or the terminal device stops data transmission with the source cell.

For example, in some scenarios, the terminal device disconnects data transmission with the source cell. Details are described below.

The terminal device maintains data transmission with the source cell is understood as that the terminal device maintains a connection (for example, an RRC connection or a user plane connection) to the source cell and user plane data transmission with the source cell. For example, uplink and downlink data (for example, including signaling and user plane data) is transmitted between the terminal device and the source cell; or is understood as that the terminal device maintains data transmission with the source network device. For example, uplink and downlink data (for example, including signaling and user plane data) is transmitted between the terminal device and the source network device. For brevity, the following uses a uniform description: The terminal device maintains data transmission with the source cell.

In at least one embodiment, the terminal device maintains data transmission (for example, including signaling and user plane data transmission) with the source cell, and the terminal device is not necessarily limited to performing data transmission with the source cell. That the terminal device maintains data transmission with the source cell is understood as that the terminal device maintains a connection, for example, an RRC connection or a user plane connection to the source cell (in other words, the terminal device maintains a connection to the source network device). In response to the terminal device transmitting data, the terminal device (or is able to or has an ability to) performs data transmission with the source cell. This is not described in the following.

In at least one embodiment, the terminal device disconnects (or interrupts or no longer maintains) data transmission (for example, including signaling and user plane data transmission) with the source cell is understood as that the terminal device disconnects the connection (for example, the RRC connection or the user plane connection) to and user plane data transmission with the source cell. For example, the terminal device stops data transmission with the source network device. For example, the terminal device stops uplink and downlink data (for example, including signaling and user plane data) transmission with the source network device. For another example, the terminal device releases the RRC connection to the source cell, releases a signaling radio bearer (signaling radio bearer, SRB) of a source master cell group (master cell group, MCG), or releases an SRB configuration/resource corresponding to the source MCG. For another example, that the terminal device releases configuration information corresponding to the source cell (or the source network device or the source MCG) includes, for example, but is not limited to that the terminal device releases one or more of the following: a cell radio network temporary identifier (cell radio network temporary identifier, C-RNTI) allocated by the source cell to the terminal device, a physical layer configuration parameter of the source cell, a media access control MAC layer configuration parameter of the source cell, a radio link control RLC layer configuration parameter of the source cell, a packet data convergence protocol PDCP layer configuration parameter of the source cell, a service data adaptation protocol SDAP layer configuration parameter of the source cell, an RRC layer configuration parameter of the source cell, or bearer configuration information of the source cell. For brevity, the following uses a uniform description: The terminal device disconnects data transmission with the source cell.

In at least one embodiment, the terminal device disconnects data transmission with the source cell, in other words, the terminal device no longer maintains data transmission with the source cell, and the terminal device is not limited to never performing data transmission with the source cell again. That the terminal device no longer maintains data transmission with the source cell is understood as that in current transmission, the terminal device stops data transmission with the source cell, and subsequently the terminal device restores data transmission with the source cell, for example, in response to the terminal device failing to hand over to the target cell and the terminal device falls back to the source cell. In other words, in current transmission, the terminal device suspends, releases, or disconnects the RRC connection or the user plane connection to the source cell (or the source network device). This is not described in the following.

The following separately provides descriptions from a plurality of aspects. The solutions mentioned in at least one embodiment are used separately, or are used in combination. The following provides descriptions with reference to content of the aspects.

Aspect 1: a scenario in which a terminal device no longer maintains data transmission with a source cell.

In any one of the following scenarios, the terminal device no longer maintains data transmission with the source cell.

Scenario 1: The terminal device maintains data transmission with the source cell in a first preset time period. In other words, the terminal device no longer maintains data transmission with the source cell after the first preset time period.

Scenario 2: A radio link failure (radio link failure, RLF) occurs in the source cell. In other words, a failure, namely, a communication failure or a communication fault occurs on a link between the terminal device and the source cell.

The following separately describes the two scenarios.

Scenario 1: The terminal device no longer maintains data transmission with the source cell after the first preset time period.

For example, the terminal device disconnects data transmission with the source cell after the first preset time period. For example, the terminal device releases the configuration information corresponding to the source cell (or a source network device) after the first preset time period. Specifically, for example, the terminal device releases one or more of the following after the first preset time period: a C-RNTI allocated by the source cell to the terminal device, a physical layer configuration parameter of the source cell, a media access control MAC layer configuration parameter of the source cell, a radio link control RLC layer configuration parameter of the source cell, a packet data convergence protocol PDCP layer configuration parameter of the source cell, a service data adaptation protocol SDAP layer configuration parameter of the source cell, an RRC layer configuration parameter of the source cell, or bearer configuration information of the source cell.

In this manner, the terminal device releases a connection to the source cell at an appropriate time point, and stop data transmission with the source cell. In this solution, the terminal device is prevented from maintaining a source connection for a long time after the terminal device communicates with a target cell, to further reduce energy consumption of the terminal device and reduce implementation complexity of the terminal device.

The first preset time period is preset, for example, pre-specified in a protocol, or preconfigured by a network device. Alternatively, the first preset time period is dynamically set based on an actual situation. This is not limited in embodiments described herein. For example, a first message (for example, an RRC reconfiguration message) sent by the source cell to the terminal device includes related information of the first preset time period, for example, duration of the first preset time period.

The first preset time period includes the duration of the first preset time period, and optionally, further includes a start moment and an end moment.

In an example, the duration of the first preset time period is preset duration, for example, pre-specified in the protocol or preconfigured by the network device.

Alternatively, the duration of the first preset time period is duration that is dynamically set based on an actual situation. For example, the duration of the first preset time period indicates estimated duration required for a process of attempting to hand over from the source cell to the target cell.

Alternatively, the duration of the first preset time period is duration estimated based on a historical situation. For example, the duration of the first preset time period indicates empirical duration required for a process of attempting to hand over from the source cell to the target cell.

The duration of the first preset time period, for example, a length or a determining manner, is not limited in embodiments described herein.

In another example, the start moment of the first preset time period is any one of the following moments:

a moment at which the terminal device receives the first message, a moment at which the terminal device determines the target cell, a moment at which the terminal device sends, to the source cell, information indicating the target cell, a moment at which the terminal device sends a second message to the source cell, a moment at which the terminal device sends a preamble to the target cell, a moment at which the terminal device receives a random access response (random access response, RAR) message, a moment at which the terminal device receives a contention resolution message, or a moment at which the terminal device sends an RRC reconfiguration complete message to the target cell.

For example, the start moment of the first preset time period is the moment at which the terminal device receives the first message. In other words, after receiving the first message, the terminal device disconnects data transmission with the source cell after the duration of the first preset time period.

The start moment of the first preset time period is not limited in embodiments described herein.

One start moment of the first preset time period and one piece of duration of the first preset time period is preset. Alternatively, a plurality of start moments of the first preset time period and a plurality of pieces of duration of the first preset time period is preset, and each start moment of the first preset time period corresponds to one piece of duration of the first preset time period. This is not limited. For example, in response to the plurality of start moments of the first preset time period and the plurality of pieces of duration of the first preset time period being preset, the terminal device chooses, based on an actual situation, to use a moment as the start moment of the first preset time period, and release the connection to the source cell after duration, of the first preset time period, corresponding to the start moment of the first preset time period.

Optionally, whether the terminal device maintains data transmission with the source cell is implemented by using a timer.

In other words, the terminal device maintains data transmission with the source cell during running of the timer, and the terminal device disconnects data transmission with the source cell after the timer stops or the duration of the first preset time period of the timer expires.

For example, that the terminal device disconnects data transmission with the source cell includes: The terminal device releases an RRC connection to the source cell, releases an SRB of an MCG, or releases an SRB configuration/resource corresponding to a source MCG, or the terminal device releases configuration information corresponding to the source cell (or the source network device or the source MCG). For details, refer to the foregoing descriptions.

In at least one embodiment, the terminal device starts a timer by using the duration of the first preset time period as duration. For differentiation, the timer is denoted as a timer T1. The terminal device maintains data transmission with the source cell in a running phase of the timer T1, and the terminal device disconnects data transmission with the source cell after the duration of the first preset time period of the timer T1 expires.

Optionally, the source cell notifies the terminal device of related information of the timer T1, for example, the duration of the timer T1. For example, the first message includes the related information of the timer T1. Alternatively, the related information of the timer T1 is agreed on in the protocol.

In an example, a moment at which the terminal device starts the timer T1 is one of the following:

the moment at which the terminal device receives the first message, the moment at which the terminal device determines the target cell, the moment at which the terminal device sends, to the source cell, the information indicating the target cell, the moment at which the terminal device sends the second message to the source cell, the moment at which the terminal device sends the preamble to the target cell, the moment at which the terminal device receives the random access response message, the moment at which the terminal device receives the contention resolution message, or the moment at which the terminal device sends the RRC reconfiguration complete message to the target cell.

For example, the timer T1 is started at the moment at which the terminal device receives the first message. After receiving the first message, the terminal device starts the timer T1 by using the duration of the first preset time period as the duration. The terminal device maintains data transmission with the source cell in the running phase of the timer T1, and the terminal device disconnects data transmission with the source cell after the duration of the first preset time period of the timer T1 expires.

The foregoing is described from the perspective of the terminal device. From the perspective of the source cell, the source cell alternatively maintains data transmission with the terminal device within a specific time period, and disconnect data transmission with the terminal device after the time period. The timer is still used as an example.

In at least one embodiment, the source cell starts a timer by using duration of a second preset time period as duration. For differentiation, the timer is denoted as a timer T2. The source cell maintains data transmission with the terminal device in a running phase of the timer T2, and the source cell disconnects data transmission with the terminal device after the timer T2 stops or the duration of the second preset time period of the timer T2 expires. For example, the source cell disconnects an RRC connection or a user plane connection to the terminal device.

The duration of the second preset time period is the same as or different from the duration of the first preset time period. This is not limited.

The duration of the second preset time period is preset duration, for example, pre-specified in the protocol or pre-configured by the network device. Alternatively, the duration of the second preset time period is duration that is dynamically set based on an actual situation. Alternatively, the duration of the second preset time period is duration estimated based on a historical situation. This is not limited in embodiments described herein.

For example, a moment at which the source cell starts the timer T2, namely, a start moment of the second preset time period is one of the following:
　a moment at which the source cell sends the first message, a moment at which the source cell receives information about the target cell, a moment at which the source cell receives the second message, a moment at which the source cell receives a third message, or a moment at which the source cell receives a handover success (HO success) message sent by the target cell.

After receiving the preamble sent by the terminal device, the target cell sends the third message to the source cell. The third message and the second message are names for differentiation, and do not limit the protection scope of embodiments described herein.

For example, the third message is a newly defined message or reuse an existing Xn message. This is not limited.

For example, the third message includes the information about the target cell. In other words, the target cell (or a target network device) indicates the information about the target cell to the source cell.

For example, the information about the target cell includes identification information of the target cell (for example, a PCI of the target cell and frequency information corresponding to the target cell, and/or a cell CGI of the target cell).

For example, the third message is further used to indicate the source cell to send a message #A to the target cell. It is understood that the source cell sends the message #A to the target cell based on the third message.

For example, the third message is further used to indicate the source cell to forward data to the target cell. It is understood that the source cell forwards the data to the target cell based on the third message. Specifically, for a type of the data forwarded by the source cell to the target cell, refer to the foregoing descriptions. Details are not described again.

Using the timer for implementation is merely an example for description, and embodiments described herein are not limited thereto. For example, signaling is used for implementation.

Scenario 2: The RLF occurs in the source cell. In other words, the failure, namely, the communication failure or the communication fault occurs on the link between the terminal device and the source cell. For brevity, the following uses a uniform description: The RLF occurs in the source cell.

In other words, after the RLF occurs in the source cell, the terminal device no longer maintains data transmission with the source cell.

Optionally, after the RLF occurs in the source cell, the terminal device performs any one of the following processing.

(1) The Terminal Device Determines, from N Candidate Cells, a Cell that is Accessed.

It is understood that the terminal device attempts to access a cell in the N candidate cells. For example, the terminal device determines, through cell selection or CHO configuration information, the cell that is accessed.

Specifically, for example, the terminal device performs cell selection. In response to the selected cell belonging to the N candidate cells, the terminal device attempts to hand over to the selected cell. In response to the selected cell not belonging to the N candidate cells, the terminal device initiates a reestablishment procedure (for example, the terminal device reestablishes a connection to the selected cell).

For another example, the terminal device determines whether there is a cell that meets a CHO execution condition in the candidate cells. If the cell that meets the CHO execution condition is determined, the terminal device attempts to hand over to the determined cell that meets the CHO execution condition. If there is no cell that meets the CHO execution condition in the candidate cells, the terminal device initiates a reestablishment procedure (for example, the terminal device reestablishes a connection to the selected cell).

(2) The Terminal Device Initiates a Reestablishment Procedure.

In at least one embodiment, the terminal device initiates a reestablishment procedure is also considered as that the terminal device initiates an RRC reestablishment procedure or the terminal device initiates an RRC connection reestablishment procedure.

For example, the RRC reestablishment procedure includes the following several steps.
　Step 1. The terminal device sends an RRC reestablishment request message to a reestablishment cell (or a network device to which the cell belongs).
　Step 2. If allowing a request of the terminal device, the reestablishment cell sends an RRC reestablishment message to the terminal device.
　Step 3. The terminal device sends an RRC reestablishment complete message to the reestablishment cell.

Herein, the reestablishment cell is a cell determined by the terminal device through cell selection, cell search, or cell detection. The reestablishment cell is a cell that meets a preset criterion, for example, a cell selection criterion S in the NR protocol TS38.304-f30. For brevity, details are not described herein. For the RRC reestablishment procedure and a specific process in which the terminal device determines the reestablishment cell, refer to a prior technology. For brevity, details are not described herein.

In the solution described in the aspect 1, the terminal device releases the connection to the source cell at an appropriate time point, and stop data transmission with the source cell. In this way, the terminal device is prevented from maintaining the source connection for a long time after the terminal device communicates with the target cell, to further reduce energy consumption of the terminal device and reduce implementation complexity of the terminal device. In addition, signaling overheads is reduced by using the timer.

In the solution described in the aspect 1, a processing method after the RLF occurs in the source cell is further provided, so that the terminal device accesses a cell in the N candidate cells as much as possible. Because the candidate cell has/stores context information of the terminal device (for example, in a handover preparation phase, each candidate cell obtains the context information of the terminal device from the source cell), it is ensured that the terminal device successfully performs access, and a latency required by a network device side to obtain the context information of the terminal device is reduced.

With reference to the aspect 1, the foregoing describes a scenario of disconnecting data transmission between the terminal device and the source cell. For example, the terminal device maintains data transmission with the source cell during running of the timer, and the terminal device disconnects data transmission with the source cell after the timer expires.

With reference to an aspect 2, the following describes a manner of processing a radio bearer (radio bearer, RB) if the terminal device maintains data transmission with the source cell in the process in which the terminal device attempts to hand over from the source cell to the target cell.

Aspect 2: a manner of processing a radio bearer in response to a terminal device maintaining data transmission with a source cell.

A radio bearer is a data radio bearer of a service, an SRB of a service, or a specified data radio bearer/signaling radio bearer. This is not limited in embodiments described herein.

Optionally, after determining a target cell from N candidate cells, the terminal device generates a radio bearer corresponding to the target cell, and maintains a radio bearer configuration corresponding to the source cell.

Generation herein indicates that the terminal device reestablishes the radio bearer corresponding to the target cell, or indicates that the terminal device establishes the radio bearer corresponding to the target cell.

The terminal device reestablishes a radio bearer, associate, with the target cell, the radio bearer obtained after the reestablishment, and maintain a radio bearer configuration corresponding to the source cell.

For example, after the terminal device determines the target cell, the terminal device reestablishes an SRB, and the reestablished SRB is mapped to (or associated with) a target MCG. In addition, the terminal device maintains an SRB configuration corresponding to a source MCG. An MCG includes a primary cell (PCell). Optionally, the MCG further includes at least one secondary cell (SCell). The source MCG belongs to a source network device, and the target MCG belongs to a target network device.

For example, if the terminal device fails to hand over to the target cell, in other words, the terminal device fails to access the target cell, the terminal device restores use of the SRB configuration corresponding to the source MCG, the terminal device reestablishes an SRB, and the reestablished SRB is mapped to (or associated with) the source MCG.

In at least one embodiment, the terminal device establishes a radio bearer corresponding to a target MCG, and suspends a radio bearer corresponding to a source MCG.

For example, it is assumed that the target MCG includes a target PCell (namely, the target cell described above), and the source MCG includes a source PCell (namely, the source cell described above). After the terminal device determines the target cell, the terminal device establishes an SRB corresponding to the target MCG (namely, the target cell). In addition, the terminal device suspends an SRB corresponding to the source MCG (namely, the source cell).

The terminal device suspends an SRB corresponding to the source MCG is understood as that the terminal device maintains (or keeps) the SRB corresponding to the source MCG, but the terminal device does not use the SRB. In this case, the terminal device maintains/keeps an SRB configuration corresponding to the source MCG.

For example, if the terminal device fails to hand over to the target cell, in other words, the terminal device fails to access the target cell, the terminal device restores (uses) the SRB corresponding to/suspended by the source MCG (or it is understood as that the UE restores use of the SRB configuration corresponding to/suspended by the source MCG). In addition, the terminal device also releases the SRB corresponding to the target MCG (or it is understood as that the UE releases an SRB configuration corresponding to the target MCG).

The foregoing embodiments are merely examples for description, and embodiments described herein are not limited thereto.

In the solution described in the aspect 2, the terminal device performs radio bearer transmission, to improve transmission performance.

With reference to the aspect 2, the foregoing describes the manner of processing the radio bearer if the terminal device maintains data transmission with the source cell in the process in which the terminal device attempts to hand over from the source cell to the target cell. With reference to an aspect 3, the following describes a possible processing manner used after a handover of the terminal device fails.

Aspect 3: a possible processing manner used after a handover of a terminal device.

In response to the terminal device failing to hand over to a target cell, in other words, the terminal device fails to access the target cell, the terminal device performs any one of the following processing.

Processing manner 1: If no RLF occurs in a source cell, the terminal device maintains data transmission with the source cell.

In other words, in response to the terminal device failing to access the target cell and no radio link failure occurring in the source cell, the terminal device falls back to the source cell, in other words, the terminal device continues to maintain data transmission with the source cell, in other words, the terminal device restores data transmission with the source cell.

In other words, in response to the terminal device failing to access the target cell and no radio link failure occurring in the source cell, the terminal device continues to use a bearer configuration (for example, an SRB configuration or a data radio bearer (DRB) configuration) corresponding to a source MCG, in other words, the terminal device restores use of the bearer configuration corresponding to the source MCG, in other words, the terminal device restores bearer configuration information (for example, SRB configuration information or DRB configuration information) corresponding to the source MCG.

For example, after the terminal device determines the target cell that meets a CHO execution condition, the terminal device fails to hand over to or access the target cell. In this case, if no RLF occurs in the source cell, the terminal device maintains data transmission with the source cell.

Optionally, if an RLF occurs in the source cell, for a possible processing manner of the terminal device, refer to the descriptions of the scenario 2 in the foregoing aspect 1. Details are not described herein again.

Processing manner 2: The terminal device continues to determine whether another candidate cell meets a CHO execution condition.

For example, after the terminal device determines the target cell that meets the CHO execution condition, if the terminal device fails to hand over to or access the target cell, the terminal device continues to determine whether a candidate cell other than the target cell meets the CHO execution condition. Alternatively, the terminal device determines whether there is a cell that meets the CHO execution condition in N2 candidate cells.

In response to the terminal device failing to hand over to or accessing the target cell, in response to no RLF occurring in a source cell, the terminal device maintains data transmission with the source cell. Optionally, in addition, the terminal device continues to determine whether there is a cell that meets the CHO execution condition in other candidate cells than the target cell in the N2 candidate cells. If the cell (for example, denoted as a cell 1) that meets the CHO execution condition is determined, the terminal device attempts to hand over to (or access) the cell 1 in response to maintaining data transmission with the source cell.

For example, if the handover between the terminal device and the cell 1 fails, the terminal device stays in the source cell until an RLF occurs in the source cell. For example, in response to the RLF occurring in the source cell, the terminal device performs reestablishment.

Alternatively, for example, if the handover between the terminal device and the cell 1 fails, the terminal device determines whether another candidate cell meets the CHO execution condition until the RLF occurs in the source cell.

In response to the terminal device failing to hand over to or access the target cell, if no RLF occurs in a source cell, the terminal device maintains data transmission with the source cell. Optionally, in addition, the terminal device continues to determine whether there is a cell that meets the CHO execution condition in other candidate cells than the target cell in N2 candidate cells. If no candidate cell meets the CHO execution condition, the terminal device maintains data transmission with the source cell until an RLF occurs in the source cell. For example, in response to the RLF occurring in the source cell, the terminal device performs reestablishment.

Optionally, in the processing manner 2, the source cell sends, to the terminal device, indication information used to indicate the terminal device to stop a procedure of determining whether the candidate cell meets the CHO execution condition. Specifically, the indication information is a Boolean value, a binary value, an information element, or in another form. This is not limited in embodiments.

Processing manner 3: The terminal device performs cell selection.

In at least one embodiment, in response to the terminal device failing to hand over to or access the target cell, in response to no RLF occurring in a source cell, the terminal device maintains data transmission with the source cell, and optionally, the terminal device performs cell selection. If a selected cell (for example, denoted as a cell 2) is a candidate cell, the terminal device attempts to hand over to (or access) the cell 2 in response to maintaining data transmission with the source cell.

For example, if the handover between the terminal device and the cell 2 fails, the terminal device stays in the source cell until an RLF occurs in the source cell. For example, in response to the RLF occurring in the source cell, the terminal device performs reestablishment.

Alternatively, for example, if the handover between the terminal device and the cell 2 fails, the terminal device performs cell selection until the RLF occurs in the source cell.

In at least one embodiment, in response to the terminal device failing to hand over to or access the target cell, in response to no RLF occurring in a source cell, the terminal device maintains data transmission with the source cell. Optionally, in addition, the terminal device performs cell selection. If a selected cell is not a candidate cell, the terminal device stays in the source cell until the RLF occurs in the source cell. For example, in response to the RLF occurring in the source cell, the terminal device performs reestablishment.

Processing manner 4: If no RLF occurs in a source cell, the terminal device falls back to the source cell, in other words, the terminal device maintains data transmission with the source cell until an RLF occurs in the source cell. In response to the RLF occurring in the source cell, the terminal device performs cell selection, or the terminal device initiates a reestablishment procedure.

For example, the terminal device performs cell selection. It is assumed that a cell selected by the terminal device through cell selection is denoted as a cell 3.

In a possible case, if the cell 3 is a candidate cell, the terminal device attempts to hand over to (or access) the cell 3.

For example, if the terminal device successfully hands over to the cell 3, it is considered that the handover succeeds. If the terminal device does not successfully hand over to (or access) the cell 3, the terminal device performs a reestablishment procedure.

In another possible case, if the cell 3 is not a candidate cell, the terminal device performs a reestablishment procedure.

The processing manner 1 is combined with the processing manner 2 or the processing manner 3. For example, if no RLF occurs in the source cell, the terminal device maintains data transmission with the source cell, and the terminal device continues to determine whether another candidate cell meets the CHO execution condition. For another example, if no RLF occurs in the source cell, the terminal device maintains data transmission with the source cell, and the terminal device performs cell selection.

The foregoing processing manner used after the handover of the terminal device fails is merely an example for description, and embodiments described herein are not limited thereto.

A specific processing manner selected by the terminal device after the handover of the terminal device fails is not limited. For example, a processing manner in the foregoing four processing manners is pre-specified in a protocol. For another example, a network device indicates a processing manner to the terminal device. For another example, the terminal device selects any processing manner. For another example, different terminal devices select different processing manners.

In the solution described in the aspect 3, several possible processing manners used after the terminal device fails to hand over to the determined target cell are provided, so that system reliability is improved.

With reference to the aspect 3, the foregoing describes the possible processing manner used after the handover of the terminal device fails. With reference to an aspect 4, the following describes a manner in which the terminal device selects the target cell.

Aspect 4: a manner in which a terminal device selects a target cell.

Optionally, after selecting (or determining) the target cell, the terminal device sends information about the target cell to a source network device. For example, the information about the target cell is carried in a second message.

A source cell learns of the information about the target cell from the terminal device (for example, the second message carries the information about the target cell), or learns of the information about the target cell from the target cell (or a target network device) (for example, a handover success message sent by the target cell to the source cell carries the information about the target cell).

For example, the information about the target cell includes identification information of the target cell (for example, a PCI of the target cell and frequency information corresponding to the target cell, and/or a cell CGI of the target cell, and/or an index (for example, an index) of the target cell).

Optionally, the terminal device selects the target cell based on any one of the following solutions.

Solution 1: The terminal device sequentially attempts to perform a handover in order of candidate cells in a cell list or in order of candidate cells appearing in a first message (for example, an RRC message).

For example, the terminal device sequentially attempts to perform a handover in order of N candidate cells in the cell list until the handover succeeds.

For another example, the terminal device sequentially attempts to perform a handover in order of N candidate cells in the cell list. After the attempt to hand over to an $n^{th}$ cell fails, refer to the processing manner in the aspect 3. n is greater than 1 or equal to 1, n is less than N or equal to N, and n is configured by a network or agreed on in a protocol. This is not limited in embodiments.

Solution 2: A network device configures priority information for a candidate cell, and the terminal device attempts to perform a handover based on a priority of the candidate cell.

In at least one embodiment, a cell has a high priority, indicating that the terminal device preferentially attempts to hand over to the cell. In other words, the terminal device preferentially attempts to hand over to a cell with a high priority.

The priority information is configured for the candidate cell in an explicit indication manner.

In an example, the network device configures priority information for N candidate cells. For example, it is assumed that N is equal to 3, priority information configured by the network device for a cell A is "00", priority information configured for a cell B is "01", and priority information configured for a cell C is "11". Assuming that "00" indicates a highest priority, the terminal device determines, based on the priority information, that the cell A has the highest priority. In other words, the terminal device preferentially attempts to hand over to the cell A.

Therefore, in this example, the terminal device performs a subsequent handover procedure based on the priority information.

For example, the terminal device preferentially attempts to hand over to a cell with the highest priority. Further, in response to the terminal device failing to hand over to the cell with the highest priority, refer to the processing manner in the aspect 3.

For another example, the terminal device sequentially attempts to perform a handover in order of priorities from a cell with the highest priority to a cell with a lowest priority until the handover succeeds.

In at least one embodiment, "00", "01", "11", and "00" indicating the highest priority are examples for description, and do not limit the protection scope.

In at least one embodiment, the priority information is configured for the candidate cell in an implicit indication manner.

Optionally, an order of the candidate cell in a first message implicitly indicates the priority information.

In other words, the network device (namely, the source network device) configures priority information for N candidate cells in an implicit indication manner, that is, the N candidate cells are sorted in a cell list in order of priorities. For example, cells in the cell list is sorted in descending order of priorities, or cells in the cell list is sorted in ascending order of priorities. The terminal device determines a priority of each candidate cell in order of the candidate cells in the cell list.

For example, the terminal device sequentially attempts to perform a handover in order of the candidate cells in the cell list until the handover succeeds. For another example, the terminal device preferentially attempts to hand over to a cell with a highest priority (for example, in response to the cells in the cell list being sorted in descending order of priorities, the terminal device preferentially attempts to hand over to the $1^{st}$ cell in the cell list). In response to the handover failing, refer to the processing manner in the aspect 3.

Solution 3: A priority of a first-type candidate cell is higher than a priority of a second-type candidate cell.

In other words, a priority of a cell for which no CHO execution condition information is configured is higher than that of a cell for which the CHO execution condition information is configured.

After receiving a first message, if candidate cells include the cell for which no CHO execution condition information is configured and the cell for which the CHO execution condition information is configured, in response to determining the target cell from a plurality of candidate cells, the terminal device preferentially selects, from the cell for which no CHO execution condition information is configured, the target cell to which the terminal device attempts to hand over.

Optionally, the terminal device obtains, in any one of the following implementations, information indicating that the priority of the first-type candidate cell is higher than the priority of the second-type candidate cell.

In at least one embodiment, an RRC reconfiguration message includes information used to indicate the priorities of the first-type candidate cell and the second-type candidate cell. Explicit indication is performed, or implicit indication is performed.

Example 1: A Network Device Configures Priority Information for Each Candidate Cell It is assumed that the first-type candidate cell includes a cell A and a cell B, and the second-type candidate cell includes a cell C. For example, a priority of cell A is "00", a priority of cell B is "01", and a priority of cell C is "11". Assuming that "00" indicates a highest priority, it is determined, based on the highest priority indicated by "00", that the cell A has the highest priority.

Example 2: A Network Device Sets a Priority for the First-Type Candidate Cell, and Sets a Priority for the Second-Type Candidate Cell For example, the priority of the first-type candidate cell is "00", and the priority of the second-type candidate cell is "11". Assuming that "00" indicates a highest priority, it is determined, based on the highest priority indicated by "00", that the first-type candidate cell has the highest priority. In other words, priorities of N1 candidate cells are higher than priorities of N2 candidate cells. In other words, a priority of any cell in the N1 candidate cells is higher than priorities of cells in the N2 candidate cells.

Optionally, the network device further configures priority information for each candidate cell in the first-type candidate cell. For example, it is assumed that the first-type candidate cell includes a cell A and a cell B, for example, a priority of the cell A is "000", and a priority of the cell B is "001". Assuming that the priority indicated by "000" is higher than the priority indicated by "001", the terminal device determines that the cell A has the highest priority. Alternatively, for another example, the network device configures priority information for the first-type candidate cell in an implicit indication manner, that is, the N1 candidate cells are sorted in the first message or a cell list in order of priorities. For example, cells in the cell list is sorted in descending order of priorities, or cells in the cell list is sorted in ascending order of priorities. The terminal device determines the priority of the first-type candidate cell in order of first-type candidate cells in the cell list.

Optionally, the network device further configures priority information for each candidate cell in the second-type candidate cell, or the network device configures priority information for the second-type candidate cell in an implicit indication manner. For details, refer to the foregoing descriptions. Details are not described again.

In at least one embodiment, priority is pre-specified.

For example, the priorities of the first-type candidate cell and the second-type candidate cell are pre-specified in a protocol. For example, it is agreed on in the protocol that the priority of the first-type candidate cell is higher than the priority of the second-type candidate cell. After the terminal device receives an RRC reconfiguration message, if the RRC reconfiguration message includes the first-type candidate cell and the second-type candidate cell, the terminal device determines that the priority of the first-type candidate cell is higher than that of the second-type candidate cell.

Optionally, the network device further configures priority information for each candidate cell in the first-type candidate cell. For example, it is assumed that the first-type candidate cell includes a cell A and a cell B, for example, a priority of the cell A is "000", and a priority of the cell B is "001". Assuming that the priority indicated by "000" is higher than the priority indicated by "001", the terminal device determines that the cell A has the highest priority. Alternatively, for another example, the network device configures priority information for the first-type candidate cell in an implicit indication manner, that is, N1 candidate cells are sorted in the first message or a cell list in order of priorities. For example, cells in the cell list is sorted in descending order of priorities, or cells in the cell list is sorted in ascending order of priorities. The terminal device determines the priority of the first-type candidate cell in order of first-type candidate cells in the cell list.

Optionally, the network device further configures priority information for each candidate cell in the second-type candidate cell, or the network device configures priority information for the second-type candidate cell in an implicit indication manner. For details, refer to the foregoing descriptions. Details are not described again. A manner in which the terminal device learns that the priority of the first-type candidate cell is higher than that of the second-type candidate cell is not limited in embodiments described herein. Any manner in which the terminal device learns that the priority of the first-type candidate cell is higher than that of the second-type candidate cell falls within the protection scope of embodiments described herein.

An example in which the priority of the first-type candidate cell is higher than the priority of the second-type candidate cell is used for description in embodiments, but a scenario in which the priority of the first-type candidate cell is lower than the priority of the second-type candidate cell is not excluded. This is not limited in embodiments described herein.

As described above, after obtaining the priority information, the terminal device sequentially attempts to perform the handover in order of priorities from the cell with the highest priority to the cell with the lowest priority until the handover succeeds.

Based on the solution 3, the terminal device performs a subsequent handover procedure based on the priority information. In response to selecting the target cell, the terminal device first selects, from the first-type candidate cell, a cell to which the terminal device hands over. In response to the handover to each first-type candidate cell failing, a cell to which the terminal device hand over is selected from the second-type candidate cell. For example, the terminal device preferentially attempts to hand over to the first-type candidate cell. In response to the handover to each first-type candidate cell failing, the terminal device selects, for a handover from the second-type candidate cell, a cell to which the terminal device hands over (for example, selects, for a handover, a cell that meets the CHO execution condition in the second-type candidate cell). For another example, the terminal device preferentially attempts to hand over to a cell in the first-type candidate cell. In response to the handover to each first-type candidate cell failing, the terminal device falls back to the source cell or maintains data transmission with the source cell until a radio link failure occurs in the source cell. After the radio link failure occurs in the source cell, the terminal device attempts to hand over to the second-type candidate cell. For another example, the terminal device preferentially attempts to hand over to a cell in the first-type candidate cell, for example, sequentially attempt to perform a handover in order of priorities of the N1 candidate cells. After the attempt to hand over an $n1^{th}$ cell in the N1 candidate cells fails, refer to the processing manner in the aspect 3. n1 is less than N1 or equal to N1, and n1 is configured by the network or agreed on in the protocol. This is not limited in embodiments.

An example in which N1 and N2 are 2 is used below for description. It is assumed that two first-type candidate cells include a cell 4 and a cell 5, and two second-type candidate cells include a cell 6 and a cell 7.

It is assumed that the priority of the first-type candidate cell is higher than the priority of the second-type candidate cell. In other words, priorities of the cell 4 and the cell 5 are higher than those of the cell 6 and the cell 7. For example, it is assumed that the cell 4 has a highest priority among the cell 4, the cell 5, the cell 6, and the cell 7.

The terminal device preferentially attempts to hand over to a cell with the highest priority, for example, the cell 4.

If the terminal device fails to hand over to the cell 4 with the highest priority, the terminal device performs any one of the following processing.

(1) The terminal device attempts to hand over to another cell in the first-type candidate cell. Specifically, if the network device configures the priority information for the first-type candidate cell by using an explicit indication or implicit indication method, the terminal device sequentially attempts to perform a handover in order of priorities of first-type candidate cells. After the attempt to hand over the $n1^{th}$ cell in the N1 candidate cells fails, refer to the processing manner in the aspect 3. n1 is less than N1 or equal to N1, and n1 is configured by the network or agreed on in the protocol. This is not limited in embodiments.

For example, the terminal device attempts to hand over to the cell 5 with a second highest priority in the first-type candidate cell.

For example, if the terminal device fails to hand over to the cell 5 (in other words, if the terminal device fails to hand over to first-type candidate cells), in a possible method, the terminal device determines whether there is a cell that meets the CHO execution condition in the second-type candidate cell (for example, the cell 6 or the cell 7). If there is the cell, the terminal device attempts to perform a handover. If there is no cell, the terminal device performs reestablishment. Alternatively, in another possible method, the terminal device performs cell selection. If a selected cell is a candidate cell (for example, a second-type candidate cell), the terminal device attempts to perform a handover. If a selected cell is not a candidate cell, the terminal device performs reestablishment. Alternatively, in still another possible method, if the network device configures the priority information for the second-type candidate cell by using an explicit indication or implicit indication method, the terminal device sequentially attempts to perform a handover in order of priorities of second-type candidate cells. After the attempt to hand over an $n2^{th}$ cell in the N2 candidate cells fails, refer to the processing manner in the aspect 3. n2 is less than N2 or equal to N2, and n2 is configured by the network or agreed on in the protocol. This is not limited in embodiments.

(2) The terminal device performs cell selection.

For example, if a selected cell is a candidate cell (for example, if the selected cell is the cell 7, the cell 6, or the cell 5), the terminal device attempts to perform a handover. If a selected cell is not a candidate cell, the terminal device performs reestablishment.

(3) The terminal device determines whether there is a cell that meets the CHO execution condition in the second-type candidate cell.

For example, the terminal device determines whether the cell 6 and the cell 7 meet the CHO execution condition.

For example, if there is the cell that meets the CHO execution condition, the terminal device attempts to perform a handover. If there is no cell that meets the CHO execution condition, the terminal device performs reestablishment.

(4) The terminal device maintains data transmission with the source cell until the RLF occurs in the source cell.

For example, after the terminal device fails to hand over to the cell with the highest priority, if no RLF occurs in the source cell, the terminal device falls back to the source cell, or the terminal device continues to maintain data transmission with the source cell. In response to the RLF occurring in the source cell, the terminal device performs cell selection. Optionally, if a selected cell is a candidate cell (for example, if the selected cell is the cell 7, the cell 6, or the cell 5), the terminal device attempts to perform a handover. If a selected cell is not a candidate cell, the terminal device performs reestablishment.

For example, for a processing manner of the terminal device after the RLF occurs in the source cell, refer to the descriptions in the aspect 1.

The foregoing enumerated (1) to (4) are merely several possible processing manners, and embodiments described herein are not limited thereto. For example, if the terminal device fails to hand over to the cell 4 with the highest priority, the terminal device alternatively performs reestablishment. For another example, cell priorities of the first-type candidate cells is the same, and the terminal device preferentially attempts to hand over to at least one of the first-type candidate cells.

The foregoing enumerated solutions are merely possible solutions, and embodiments described herein are not limited thereto. For example, alternatively, the priority of the second-type candidate cell is higher than the priority of the first-type candidate cell.

In the solution described in the aspect 4, in response to the candidate cells including the first-type candidate cell and the second-type candidate cell, the terminal device preferentially attempts to hand over to at least one first-type candidate cell. Therefore, the terminal device appropriately performs the handover, and the terminal device does not need to determine whether the cell meets the CHO execution condition, to reduce implementation complexity, energy consumption, and a handover latency.

With reference to the aspect 4, the foregoing describes the manner in which the terminal device selects the target cell. With reference to an aspect 5, the following describes a case in which the terminal device releases configuration information of a candidate cell (for example, including CHO configuration information of at least one second-type candidate cell and configuration information of a first-type candidate cell). An example in which the terminal device releases CHO configuration information of at least one second-type candidate cell is mainly used below for description.

Aspect 5: a case in which a terminal device releases CHO configuration information of a second-type candidate cell.

The terminal device releases CHO configuration information of N2 candidate cells in one of the following cases.

Case 1: In response to a handover succeeding, the terminal device releases the CHO configuration information.

For example, the terminal device releases the CHO configuration information in response to the terminal device successfully handing over to or accessing a cell that meets a CHO execution condition. For another example, in response to the terminal device successfully hands over to or accesses a cell that is a candidate cell and that is selected after cell selection is performed, the terminal device releases the CHO configuration information.

In at least one embodiment, "when . . . " mentioned for a plurality of times is not limited to necessarily simultaneous occurrence. For example, that the terminal device releases the CHO configuration information in response to the terminal device successfully handing over to or accessing a cell that meets a CHO execution condition indicates that the terminal device releases the CHO configuration information if the terminal device successfully hands over to or accesses the cell that meets the CHO execution condition. Details are not described in the following again.

Case 2: In response to a network device indicating the terminal device to cancel a CHO procedure or release the CHO configuration information, the terminal device releases the CHO configuration information.

For example, the network device (for example, a source network device or a target network device) sends, to the terminal device, a message used to indicate the terminal device to cancel the CHO procedure or release the CHO configuration information. After receiving the message, the terminal device cancels the CHO procedure or releases the CHO configuration information.

Case 3: In response to the terminal device initiating a reestablishment procedure, the terminal device releases the CHO configuration information.

For example, in response to the reestablishment procedure being triggered, reestablishment succeeds, or reestablishment fails, the terminal device releases the CHO configuration information.

There are many trigger conditions for initiating the reestablishment procedure by the terminal device. This is not limited in embodiments described herein.

For example, after the terminal device fails to hand over to a cell that meets a CHO execution condition, the terminal device performs cell selection. If a selected cell is not a candidate cell, the terminal device initiates the reestablishment procedure.

For another example, after the terminal device fails to hand over to a cell that meets a CHO execution condition, the terminal device performs cell selection, and a selected cell is a candidate cell. The terminal device attempts to hand over to the cell, but the terminal device fails to hand over to the cell. In this case, the terminal device initiates the reestablishment procedure.

For another example, the terminal device fails to hand over to a cell that meets a CHO execution condition, and the terminal device continues to perform determining and finds that another candidate cell does not meet the CHO execution condition. In this case, the terminal device initiates the reestablishment procedure.

For another example, after a handover fails (for example, the terminal device fails to hand over to candidate cells, fails to hand over to at least one candidate cell that meets a CHO execution condition, or fails to hand over to at least one cell that is a candidate cell and that is selected after cell selection is performed), the terminal device initiates the reestablishment procedure.

For another example, after a handover fails (for example, the terminal device fails to hand over to candidate cells, fails to hand over to at least one candidate cell that meets a CHO execution condition, or fails to hand over to at least one cell that is a candidate cell and that is selected after cell selection is performed), and an RLF occurs in a source cell, the terminal device initiates the reestablishment procedure.

Case 4: In response to the terminal device falls back to a source cell, the terminal device releases the CHO configuration information.

If no RLF occurs in the source cell, the terminal device falls back to the source cell. That the terminal device falls back to the source cell indicates that the terminal device continues to stay in the source cell, or the terminal device continues to maintain data transmission with the source cell.

There are many trigger conditions for the terminal device to fall back to the source cell. This is not limited in embodiments described herein.

For example, after the terminal device fails to hand over to a cell that meets a CHO execution condition, the terminal device falls back to the source cell.

For another example, after the terminal device fails to hand over to a cell that meets a CHO execution condition, the terminal device performs cell selection, and a selected cell is a candidate cell. The terminal device attempts to hand over to the cell, but the terminal device fails to hand over to the cell, and the terminal device falls back to the source cell.

For another example, the terminal device fails to hand over to a cell that meets a CHO execution condition, the terminal device continues to determine that another candidate cell does not meet the CHO execution condition, and the terminal device falls back to the source cell.

For another example, after a handover of the terminal device fails (for example, the terminal device fails to hand over to candidate cells, fails to hand over to at least one candidate cell that meets a CHO execution condition, or fails to hand over to at least one cell that is a candidate cell and that is selected after cell selection is performed), the terminal device falls back to the source cell.

In any one of the foregoing cases, the terminal device releases the CHO configuration information.

In the solution described in the aspect 5, the terminal device releases the CHO configuration information appropriately and in a timely manner, to reduce energy consumption and storage space of the terminal device.

The foregoing separately provides detailed descriptions from the five aspects. The solutions mentioned in the foregoing aspects is used separately, or is used in combination. For example, the manner of processing the radio bearer in response to the terminal device maintaining data transmission with the source cell in the aspect 2 is used in the scenario in response to the terminal device maintaining data transmission with the source cell mentioned in any one of the foregoing aspects. For another example, the possible processing manner used after the handover of the terminal device fails in the aspect 3 is used in the scenario after the handover fails mentioned in any one of the foregoing aspects.

The following describes the foregoing message #A in detail.

The message #A is a newly defined message, for example, an early forwarding transfer message; or the message #A reuses an existing message, for example, an SN status transfer message. This is not limited in embodiments. In response to the message #A being an SN status transfer message, optionally, the message #A includes indication information, where the indication information is used to indicate that the message #A is different from a SN status transfer message. Specifically, for content that is included in the SN status transfer message, refer to a prior technology. Details are not described.

Optionally, the message #A includes, for example, a first downlink (DL) count (COUNT) value. The first DL count value is used to indicate a DL count value of the $1^{st}$ forwarded DL PDCP SDU. The count value includes, for example, a PDCP SN and a hyper frame number (HFN).

Alternatively, the message #A includes a second DL count value. The second DL count value is used to indicate a target network device to discard a PDCP SDU whose count value is less than the second DL count value in a buffer (in other words, the target network device sends, to a terminal device, a PDCP SDU whose count value is greater than the second DL count value in the buffer). Specifically, for example, the message #A is an early forwarding transfer message. Between the 1 message #A (namely, the early forwarding transfer) and the SN status transfer message, a source network device further sends one or more messages #A (namely, early forwarding transfer messages) to the target network device, and the one or more early forwarding transfer messages includes the second DL count value.

Optionally, the 1V early forwarding transfer message includes a first uplink (uplink, UL) count value. The first UL count value is used to indicate a UL count value of the $1^{st}$ lost (or out-of-order) UL PDCP SDU and a receiving status of the UL PDCP SDU(s). The receiving status is used to indicate a receiving status of at least one UL PDCP SDU starting from the $1^{st}$ lost (or out-of-order) UL PDCP SDU. For example, a bitmap is used to indicate the receiving status. For example, the 1 bit in the bitmap indicates a receiving status of the $1^{st}$ lost (or out-of-order) UL PDCP SDU. For example, the $1^{st}$ bit in the bitmap is a binary value "0", that is, the binary value "0" is used to indicate that a data packet is lost or out of order. Specifically, in an example, "0" in the bitmap indicates that a corresponding PDCP SDU is not successfully received, and "1" indicates that a corresponding PDCP SDU is successfully received.

Optionally, a $P^{th}$ (where P is greater than 0) early forwarding transfer message in the one or more early forwarding transfer messages sent between the $1^{st}$ message #A (namely, the early forwarding transfer) and the SN status transfer message includes a $(P+1)^{th}$ UL count value. The $(P+1)^{th}$ UL count value is used to indicate a UL count value of the $1^{st}$ lost (or out-of-order) UL PDCP SDU and a receiving status of the UL PDCP SDU(s). The receiving status is used to indicate a receiving status of at least one UL PDCP SDU starting from the $1^{st}$ lost (or out-of-order) UL PDCP SDU. For example, a bitmap is used to indicate the receiving status. For example, the $1^{st}$ bit in the bitmap indicates a receiving status of the $1^{st}$ lost (or out-of-order) UL PDCP SDU. For example, the $1^{st}$ bit in the bitmap is a binary value "0", that is, the binary value "0" is used to indicate that a data packet is lost or out of order. Specifically, in an example, "0" in the bitmap indicates that a corresponding PDCP SDU is not successfully received, and "1" indicates that a corresponding PDCP SDU is successfully received.

Optionally, the $P^{th}$ (where P is greater than 0) early forwarding transfer message further includes the first UL count value. The first UL count value is used to indicate a UL count value of the $1^{st}$ lost (or out-of-order) UL PDCP SDU in response to the $1^{st}$ early forwarding transfer message being sent, and a receiving status of the UL PDCP SDU(s) at the source network device in response to the $1^{st}$ early forwarding transfer message being sent. The receiving status is used to indicate a receiving status of at least one UL PDCP SDU starting from the $1^{st}$ lost (or out-of-order) UL PDCP SDU in response to the source network device sending the $1^{st}$ early forwarding transfer message. For example, a bitmap is used to indicate the receiving status. For example, the $1^{st}$ bit in the bitmap indicates a receiving status of the $1^{st}$ lost (or out-of-order) UL PDCP SDU. For example, the $1^{st}$ bit in the bitmap is a binary value "0", that is, the binary value "0" is used to indicate that a data packet is lost or out of order. Specifically, in an example, "0" in the bitmap indicates that a corresponding PDCP SDU is not successfully received, and "1" indicates that a corresponding PDCP SDU is successfully received.

The foregoing describes content of the message #A by using an example. Other information that is included in the message #A or a name of the message #A is not limited in embodiments described herein.

Figure 5A:
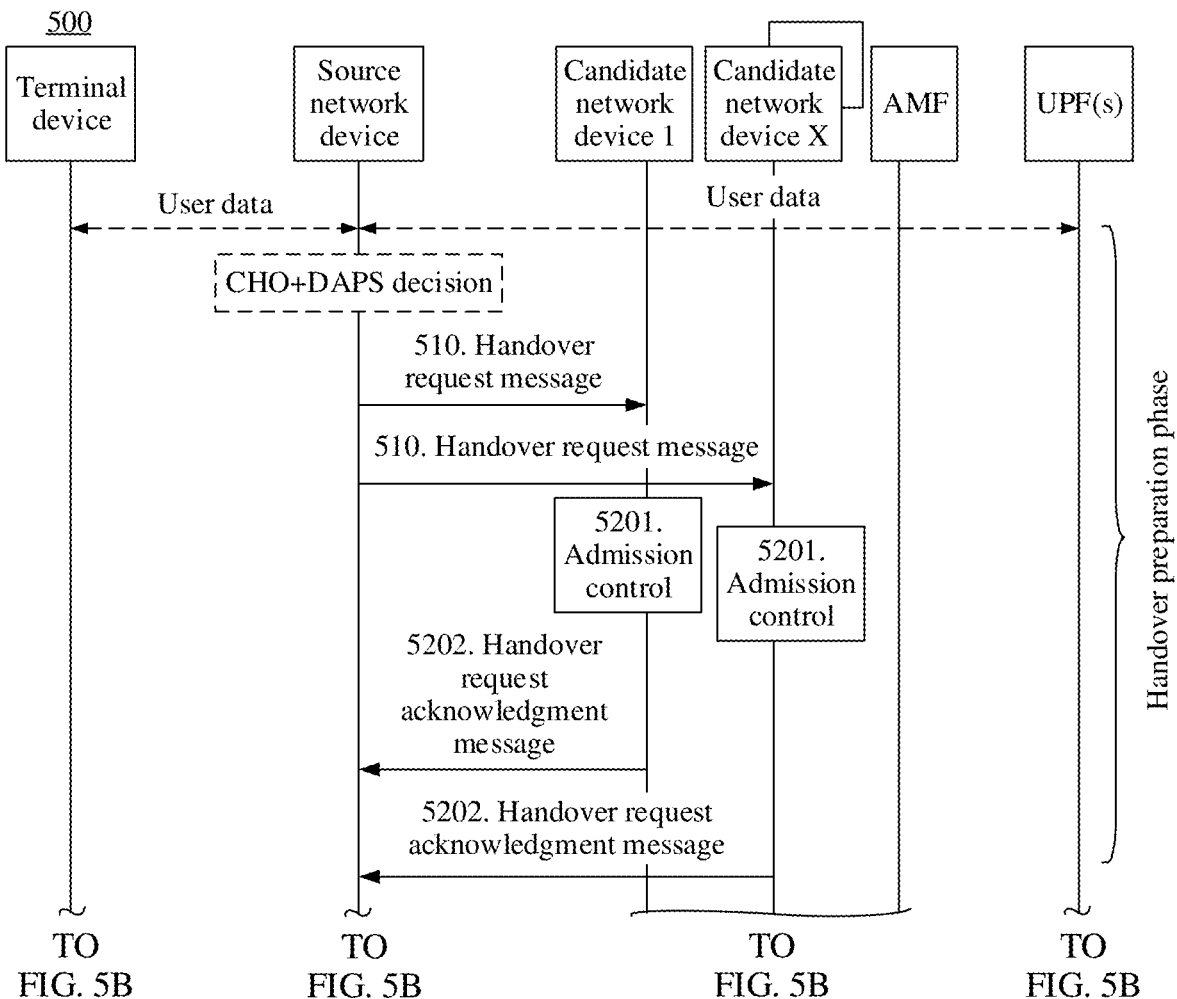
FIG. 5A, FIG. 5B, and FIG. 5C are a schematic flowchart of a handover method according to at least one embodiment.
Figure 5B:
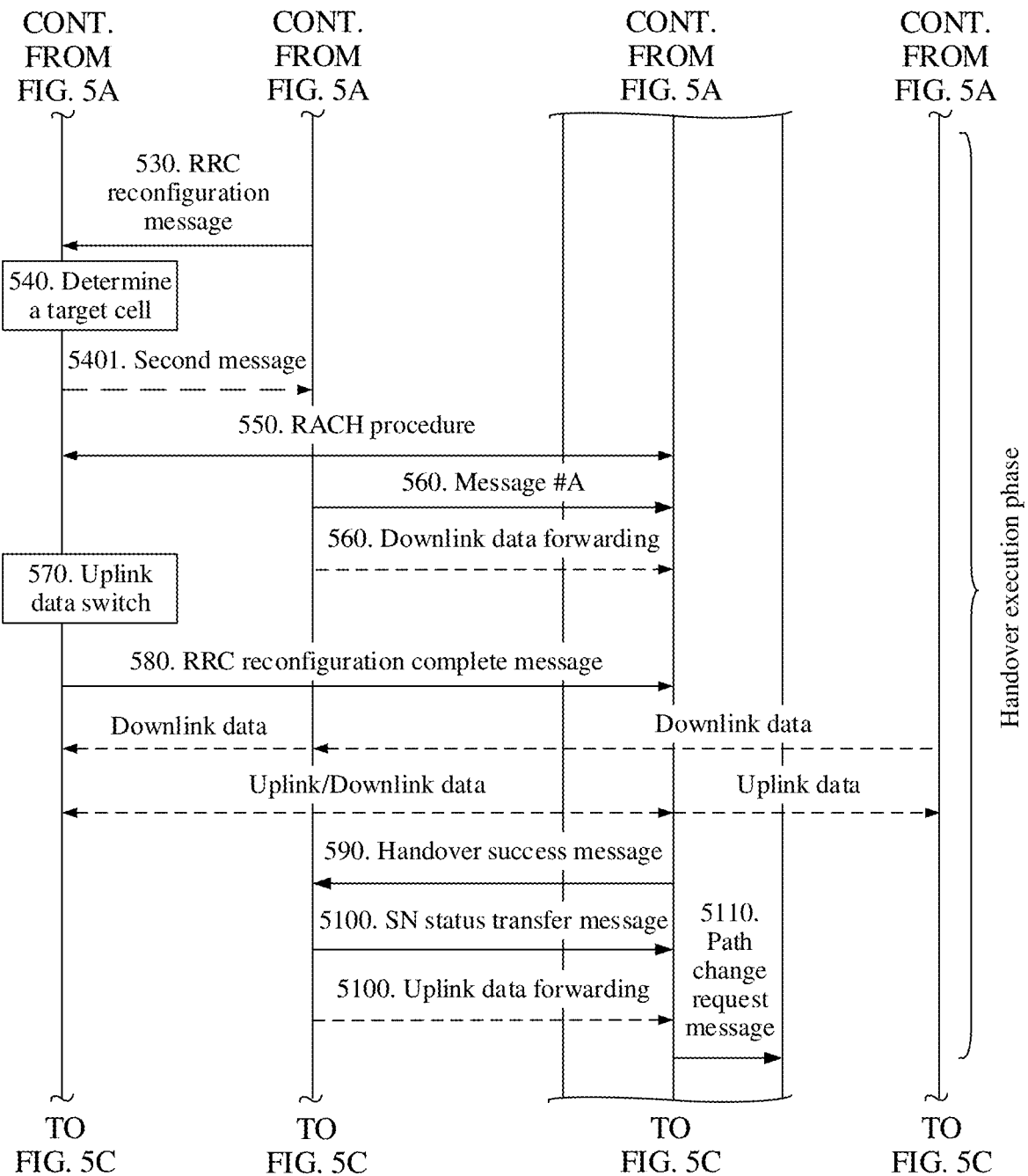
Figure 5C:
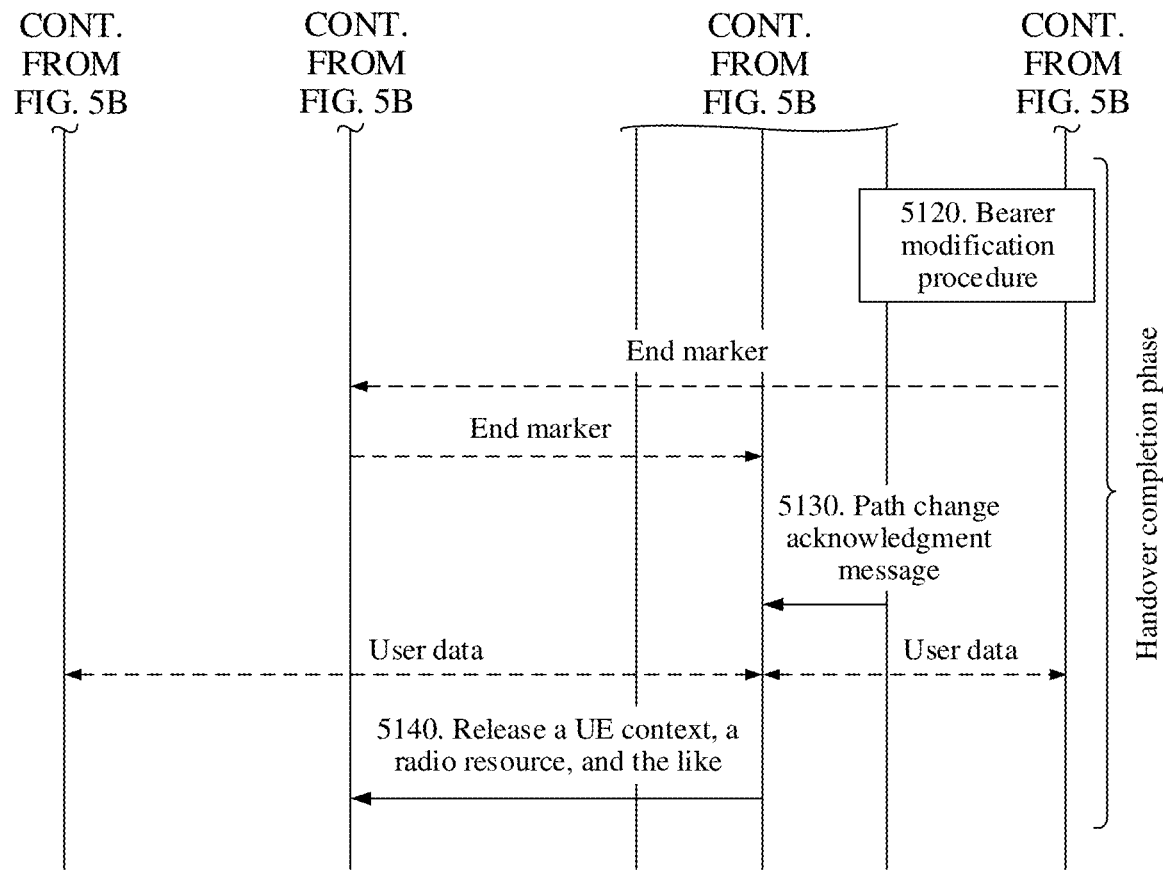

For ease of understanding, the following describes a possible overall procedure with reference to a method 500 shown in FIG. 5A, FIG. 5B, and FIG. 5C.

As shown in FIG. 5A, FIG. 5B, and FIG. 5C, three phases are roughly included: a handover preparation phase, a handover execution phase, and a handover completion phase.

The three phases shown in FIG. 5A, FIG. 5B, and FIG. 5C are divided merely for ease of understanding, and there is no strict phase division actually. Whether the phases are divided or how the phases are divided does not limit the protection scope of this embodiment described herein.

Optionally, the method 500 includes the following steps.

510. A source network device sends a handover request message to a candidate network device.

The source network device sends the handover request message to at least one candidate network device. For example, as shown in FIG. 5A, FIG. 5B, and FIG. 5C, in step 510, the source network device sends a handover request message to each of a candidate network device 1 and a candidate network device X.

The candidate network device X indicates a network device in the at least one candidate network device.

The source network device determines whether to use the solution in this embodiment described herein. In other words, the source network device determines whether to consider handover reliability and handover latency reduction. For example, the source network device determines whether to perform a handover in a "CHO+dual active protocol stack (DAPS)" handover manner. In other words, the source network device determines whether to maintain data transmission between a terminal device and the source network device after the source network device sends a message including CHO configuration information, after the terminal device determines a target cell to which the terminal device is to hand over, or after the terminal device successfully hands over to a determined target cell.

Optionally, the handover request message includes first indication information and/or second indication information.

The handover request message is at a cell granularity, that is, different candidate cells separately correspond to one handover request message. The different candidate cells belong to a same candidate network device or different candidate network devices. For example, the source network device determines to use a cell A, a cell B, and a cell C as candidate cells. The cell A and the cell B belong to the candidate network device 1, and the cell C belongs to a candidate network device 2. In this case, the source network device sends one handover request message to the candidate network device 1 for the cell A, and the source network device sends another handover request message to the candidate network device 1 for the cell B. In addition, the source network device sends one handover request message to the candidate network device 2 for the cell C.

The first indication information is used to indicate that the terminal device maintains data transmission with the source network device (or maintains a connection, for example, an RRC connection, to the source network device) in a handover process, for example, after the terminal device determines the target cell. Alternatively, it is understood as that the first indication information is used to indicate that a 0-millisecond (ms) handover interruption latency needs to be implemented for the handover.

For example, the first indication information is at a cell granularity, a UE granularity, or a DRB granularity. This is not limited. An example in which the first indication information is at the DRB granularity is used for description. For example, if a 0-ms handover interruption latency needs to be implemented for a DRB 1 and a DRB 2 that correspond to the cell A, the handover request message sent by the source network device to the candidate network device 1 for the cell A includes first indication information corresponding to the DRB 1 and first indication information corresponding to the DRB 2.

The second indication information is used to indicate that the handover request message is used for a CHO mechanism, in other words, the second indication information is used to indicate that the CHO mechanism is used in the handover procedure, in other words, the handover request message is used to request the candidate network device to perform admission control or resource allocation/reservation for a CHO.

For example, the second indication information is at a cell granularity, a UE granularity, or a DRB granularity. This is not limited. An example in which the second indication information is at the cell granularity is used for description. For example, if the candidate network device 1 needs to perform CHO configuration for the corresponding cell A, the handover request message sent by the source network device to the candidate network device 1 for the cell A includes second indication information. If the candidate network device 1 needs to perform CHO configuration for the corresponding cell B, the another handover request message sent by the source network device to the candidate network device 1 for the cell B includes second indication information.

After receiving the handover request message of the source network device, the candidate network device performs step 5201.

5201. The candidate network device performs admission control.

In other words, each of the at least one candidate network device performs admission control and corresponding handover preparation or resource allocation based on the handover request message.

5202. The candidate network device sends a handover request acknowledgment (ACK) (handover request ACK) message to the source network device.

Based on the admission control and the corresponding handover preparation, if the candidate network device allows the terminal device to access or hand over to the candidate network device, the candidate network device in the at least one candidate network device sends a response message for the handover request message to the source network device. The at least one candidate network device is not limited to allowing access or a handover of the terminal device, and one or some of the at least one candidate network device rejects the access or the handover of the terminal device. This is not limited in this embodiment.

In other words, if the at least one candidate network device receiving the handover request message of the source network device agrees with a handover request, the at least one candidate network device returns the handover request acknowledgment message to the source network device. For example, as shown in FIG. 5A, FIG. 5B, and FIG. 5C, in step 5202, the candidate network device 1 and the candidate network device X each send a handover request acknowledgment message to the source network device.

Optionally, the handover request acknowledgment message includes CHO configuration information (CHO configurations) corresponding to at least one candidate cell. For example, the handover request acknowledgment message returned by the candidate network device 1 includes CHO configuration information of at least one candidate cell that belongs to the candidate network device 1, and the handover request acknowledgment message returned by the candidate network device X includes CHO configuration information of at least one candidate cell that belongs to the candidate network device X.

The following describes the CHO configuration information corresponding to the candidate cell in detail with reference to the CHO mechanism.

Optionally, the handover request acknowledgment message includes the first indication information and/or the second indication information.

After receiving the handover request acknowledgment message of the candidate network device, the source network device sends an RRC reconfiguration message (namely, an example of the first message in the method 400) to the terminal device.

530. The source network device sends the RRC reconfiguration message to the terminal device. The RRC reconfiguration message includes information about N candidate cells. A specific value of N is not limited in this embodiment.

Optionally, the RRC reconfiguration message includes CHO configuration information corresponding to N2 candidate cells.

For the N candidate cells and the N2 candidate cells, refer to the descriptions in the foregoing method 400.

Optionally, the RRC reconfiguration message further includes the first indication information and/or the second indication information.

The first indication information is a binary value, a Boolean value, an information element, or in another representation form. This is not limited in this embodiment. For a representation form of the second indication information, refer to the first indication information. Details are not described again.

The source network device indicates CHO configuration information of one or more candidate cells to the terminal device by using one RRC message or a plurality of RRC messages. A quantity of RRC messages herein is not necessarily in a one-to-one correspondence with a quantity of candidate cells. The source network device indicates the CHO configuration information of the one or more candidate cells by using one RRC message, or indicates CHO configuration information of a plurality of candidate cells by using a plurality of RRC messages. This is not limited in embodiments described herein.

After receiving the RRC reconfiguration message, the terminal device determines the target cell based on the information about the N candidate cells.

540. The terminal device determines the target cell.

For example, in response to N2 being greater than 0, the terminal device evaluates the CHO configuration information to determine the target cell. Alternatively, in response to N being equal to N2 (that is, the N configured candidate cells are cells for which CHO execution condition information or the CHO configuration information is configured), the terminal device evaluates the CHO configuration information to determine the target cell. In other words, the terminal device determines, from the N2 candidate cells, a cell that meets a CHO execution condition as the target cell to which the terminal device is to hand over. For details, refer to the foregoing descriptions.

For a manner of determining the target cell by the terminal device, refer to the foregoing descriptions, for example, refer to the descriptions in the foregoing aspect 4.

Optionally, step 540 further includes step 5401.

5401. After determining the target cell, the terminal device sends a second message to the source network device.

For example, the second message is an RRC message, a layer 2 message (for example, a MAC CE or a PDCP PDU), or a physical layer message. This is not limited.

For example, the second message includes information about the target cell. In other words, after determining the target cell, the terminal device indicates the information about the target cell to the source network device.

For example, the information about the target cell includes identification information of the target cell (for example, a PCI of the target cell and frequency information corresponding to the target cell, and/or a cell CGI of the target cell, and/or an index of the target cell).

For example, the second message is further used to indicate the source network device to send a message #A to a target network device. The source network device sends the message #A to the target network device based on the second message.

For example, the second message is further used to indicate the source network device to forward data to the target network device. The source network device forwards the data to the target network device based on the second message.

A type of the data forwarded by the source network device to the target network device is not limited. For example, the source network device forwards downlink data (for example, a DL PDCP SDU(s)) to the target network device. For another example, the source network device forwards uplink data and downlink data to the target network device.

Optionally, after receiving the second message, the source network device starts a timer T2. For the timer T2, refer to the descriptions of the aspect 1 in the foregoing method 400.

Alternatively, optionally, after sending the second message to the source network device, the terminal device starts a timer T1. Alternatively, after determining the target cell (that is, step 540), the terminal device starts the timer T1. For the timer T1, refer to the descriptions of the aspect 1 in the foregoing method 400.

Optionally, after the terminal device determines the target cell (for example, the determined target cell belongs to the candidate network device X in FIG. 5A, FIG. 5B, and FIG. 5C, that is, the candidate network device X is the determined target network device), the terminal device continues to maintain data transmission (for example, uplink and downlink data transmission) with the source network device. For example, the terminal device continues to maintain data transmission with the source network device until an RLF occurs on the source network device, or until the network device (for example, the source network device or the target network device) indicates the terminal device to disconnect data transmission with the source network device.

For details of maintaining data transmission with the source network device by the terminal device in the handover process, refer to the related descriptions in the foregoing method 400.

After determining the target cell, the terminal device attempts to perform a RACH procedure (a random access procedure) with the target network device.

550. The terminal device performs the RACH procedure with the target network device.

Optionally, the terminal device starts the timer T1 in response to starting to perform the RACH procedure with the target network device. For the timer T1, refer to the descriptions of the aspect 1 in the foregoing method 400.

A specific manner in which the terminal device performs the RACH procedure with the target network device is not limited in this embodiment described herein.

In at least one embodiment, the terminal device sends a preamble (preamble) to the target network device. After receiving the preamble, the target network device sends a third message to the source network device.

For example, the third message is a newly defined message, or reuse an existing Xn message (in an NR system) or an X2 message (in an LTE system). This is not limited.

For example, the third message includes the information about the target cell. In other words, the target network device indicates the information about the target cell to the source network device.

For example, the information about the target cell includes the identification information of the target cell (for example, the PCI of the target cell and the frequency information corresponding to the target cell, and/or the CGI of the target cell, and/or the index (for example, an index) of the target cell).

For example, the third message is further used to indicate the source network device to send the message #A to the target network device. The source network device sends the message #A to the target network device based on the third message.

For example, the third message is further used to indicate the source network device to forward data to the target network device. The source network device forwards the data to the target network device based on the third message.

The source network device sends the message #A to the target network device based on the received third message or the second message that is received in step 5401.

Optionally, after receiving the third message sent by the target network device, the source network device starts the timer T2. For the timer T2, refer to the descriptions of the aspect 1 in the foregoing method 400.

560. The source network device sends the message #A to the target network device.

For the message #A, refer to the descriptions in the foregoing method 400. Details are not described herein again.

In addition, the source network device forwards the downlink data (for example, the DL PDCP SDU(s)) to the target network device. The type of the data forwarded by the source network device to the target network device is not limited. For example, in addition to the DL PDCP SDU(s), the source network device further forwards a UL PDCP SDU(s) to the target network device. For another example, the source network device forwards the UL PDCP SDU(s) to the target network device.

The source network device sends the DL PDCP SDU(s) and a PDCP sequence number (SN) corresponding to the DL PDCP SDU(s) through a general packet radio service (GPRS) tunneling protocol for the user plane (GTP-U) tunnel between the source network device and the target network device. For example, a GTP-U extension header carries the PDCP SN, to forward the downlink data between the source network device and the target network device. For a solution of forwarding the uplink data between the source network device and the target network device, refer to the downlink solution. Details are not described again. A solution that can implement forwarding of the downlink data between the source network device and the target network device falls within the protection scope of embodiments described herein.

The RACH procedure between the terminal device and the target network device succeeds or fails.

Optionally, in response to the RACH procedure failing, in other words, a handover of the terminal device fails, refer to the descriptions in the foregoing method 400, for example, the descriptions of the possible processing manner used after the handover of the terminal device fails in the aspect 3.

Optionally, in response to the RACH procedure succeeding, in other words, a handover of the terminal device succeeds, the terminal device performs uplink switch (UL switch), that is, uplink data switch. The uplink data switch means that the terminal device no longer sends a newly generated UL PDCP SDU to the source network device, but sends the newly generated UL PDCP SDU to the target network device. Optionally, for a UL data packet sent by the terminal device to the source network device before the RACH succeeds, if the UL data packet fails to be sent, after the RACH succeeds, the terminal device continues to retransmit the UL data packet to the source network device, or the terminal device discards the UL data packet. This is not limited in this embodiment.

For example, in a non-contention-based RACH procedure, in response to the terminal device receiving a MSG 2, for example, a random access response (RAR) message, the terminal device performs UL switch.

For another example, in a contention-based RACH procedure, in response to the terminal device receiving a MSG 4, for example, a contention resolution message, the terminal device performs UL switch.

Optionally, in response to the RACH procedure succeeding, in other words, the handover of the terminal device succeeds, the terminal device further sends an RRC reconfiguration complete message to the target network device.

Assuming that the RACH procedure succeeds, the method 500 includes step 570 and step 580.

570. The terminal device performs uplink data switch.

580. The terminal device sends the RRC reconfiguration complete message to the target network device.

Optionally, after the RACH procedure succeeds, in other words, the handover of the terminal device succeeds, the terminal device further releases the CHO configuration information. A trigger condition for releasing the CHO configuration information by the terminal device alternatively is another condition. For details, refer to the descriptions of the aspect 5 in the method 400.

Optionally, after the RACH procedure succeeds, in other words, the handover of the terminal device succeeds, the terminal device further releases the connection to the source network device (for example, the terminal device disconnects the RRC connection to the source network device, the terminal device stops radio link monitoring on the source network device, or the terminal device stops data transmission with the source network device). A trigger condition for releasing the connection to the source network device by the terminal device alternatively is another condition. For details, refer to the descriptions of the aspect 1 in the method 400.

590. The target network device sends a handover success message to the source network device.

In other words, in step 590, the target network device sends a message to the source network device, to indicate that the handover succeeds. For example, the message is a handover success (HO SUCCESS) message or another message. This is not limited. In at least one embodiment, without loss of generality, the handover success message is used for description.

In an example, after receiving the RRC reconfiguration complete message, the target network device sends the handover success message to the source network device, to notify the source network device that the terminal device has successfully handed over to the target network device.

Optionally, in response to the target network device notifying the source network device of the information about the target cell, the information about the target cell is carried in the handover success message sent by the target network device to the source network device. That is, the handover success message includes the information about the target cell. Specifically, for content included in the information about the target cell, refer to the foregoing descriptions. Details are not described again.

5100. The source network device sends a sequence number status transfer message to the target network device.

Optionally, after the source network device receives the handover success message, or in response to the source network device sending the SN status transfer message, the UL data is forwarded between the source network device and the target network device.

For example, the source network device sends the UL PDCP SDU(s) and a PDCP SN corresponding to the UL PDCP SDU(s) through the GTP-U tunnel between the source network device and the target network device. For example, a GTP-U extension header carries the PDCP SN, to forward the uplink data between the source network device and the target network device.

For example, the source network device forwards, to the target network device, an out-of-order uplink data packet received from the terminal device. For example, starting from the $1^{st}$ out-of-order UL PDCP SDU, data packets (if existent) following the $1^{st}$ out-of-order packet are forwarded to the target network device.

Optionally, the SN status transfer message sent by the source network device to the target network device includes one or more of the following: a start DL count value used in response to the target network device allocating a PDCP SN to a downlink data packet (for example, a PDCP SDU) to which no PDCP SN is allocated, a UL count value of the $1^{st}$ lost uplink data packet, or a receiving status of the UL PDCP SDU(s). The receiving status is used to indicate a receiving status of at least one UL PDCP SDU starting from the $1^{st}$ lost (or out-of-order) UL PDCP SDU. For example, a bitmap is used to indicate the receiving status. For example, the $1^{st}$ bit in the bitmap indicates a receiving status of the $1^{st}$ lost (or out-of-order) UL PDCP SDU. For example, the 1 bit in the bitmap is a binary value "0", that is, the binary value "0" is used to indicate that a data packet is lost or out of order. Specifically, in an example, "0" in the bitmap indicates that a corresponding PDCP SDU is not successfully received, and "1" indicates that a corresponding PDCP SDU is successfully received.

Optionally, after step 560 and before step 5100, the source network device sends at least one message #A to the target network device. For ease of context description, to avoid confusion, without loss of generality, each of the at least one message #A is denoted as a fourth message herein. The fourth message is an early forwarding transfer message or another message. This is not limited. Specifically, the fourth message includes, for example, a $Q^{th}$ (where Q is greater than 1) DL count value. The $Q^{th}$ DL count value is used to indicate the target network device to discard a PDCP SDU whose count value is less than the $Q^{th}$ DL count value in a buffer (in other words, the target network device sends, to the terminal device, a PDCP SDU whose count value is greater than the $Q^{th}$ DL count value in the buffer). The count value includes, for example, a PDCP SN and an HFN.

Optionally, the fourth message further includes an $S^{th}$ (where S is greater than 1) UL count value, and the $S^{th}$ UL count value is used to indicate a UL count value of the 1$^{st}$ lost (or out-of-order) UL PDCP SDU in response to the fourth message being sent. In addition, the fourth message further includes a receiving status of a UL PDCP SDU(s) at the source network device in response to the fourth message being sent. The receiving status is used to indicate a receiving status of at least one UL PDCP SDU starting from the 1$^{st}$ lost (or out-of-order) UL PDCP SDU in response to the source network device sending the fourth message. For example, a bitmap is used to indicate the receiving status. For example, the 1$^{st}$ bit in the bitmap indicates a receiving status of the 1$^{st}$ lost (or out-of-order) UL PDCP SDU. For example, the 1$^{st}$ bit in the bitmap is a binary value "0", that is, the binary value "0" is used to indicate that a data packet is lost or out of order. Specifically, in an example, "0" in the bitmap indicates that a corresponding PDCP SDU is not successfully received, and "1" indicates that a corresponding PDCP SDU is successfully received.

Optionally, after receiving the SN status transfer message, the target network device sends a fifth message to the terminal device, to indicate the terminal device to disconnect data transmission with the source network device. For example, the fifth message is an RRC reconfiguration message, a layer 2 message (for example, a MAC CE or a PDCP control PDU), a physical layer message (for example, DCI), or another message. This is not limited in this embodiment. The fifth message includes indication information, and the indication information is used to indicate the terminal device to disconnect data transmission with the source network device. For example, the indication information is a Boolean value, an information element, or in another representation form. This is not limited in this embodiment.

After the target network device receives the SN status transfer message, or a UL data forwarding procedure between the source network device and the target network device is triggered, the target network device performs a path change procedure with an AMF.

For a manner in which the target network device performs the path change procedure with the AMF, refer to a prior technology. This is not limited in embodiments described herein.

5110. The target network device sends a path change request message to the AMF.

5120. The AMF performs a bearer modification procedure with a UPF.

After a path change succeeds, the AMF sends a response message for the path change request message to the target network device.

5130. The AMF sends a path change acknowledgment message to the target network device.

After determining that the path change succeeds, the target network device indicates the source network device to release a UE context, a radio resource, and the like.

5140. The target network device indicates the source network device to release the UE context, the radio resource, and the like.

Steps in the method 500 are not necessarily performed. For example, some steps is skipped. In addition, an execution sequence of each step is not fixed, and is not limited to that shown in the figure. The execution sequence of each step is determined based on a function and internal logic of the step. For example, an execution sequence of step 560 and step 570 is not limited.

The method 500 is merely an example for description, and the solutions in the aspect 1 to the aspect 5 in the method 400 is used in the method 500. For example, for a handover failure scenario mentioned in the method 500, refer to the solution in the aspect 3 in the method 400. For another example, for a radio bearer processing method in a scenario in which the terminal device maintains data transmission with the source cell mentioned in the method 500, refer to the solution in the aspect 2 in the method 400.

In response to a timer being introduced, for example, the terminal device starts the timer T1 in any step such as step 530, step 540, step 5401, step 550, or step 580. Alternatively, for example, the source network device starts the timer T2 in any step such as step 530, step 5401, step 550, or step 590.

The process of the handover from the source cell to the target cell in the method 400 is the handover execution phase in the method 500, or is from the handover execution phase to the handover completion phase. For another example, the process of the handover from the source cell to the target cell includes a phase from step 540 to step 5100, includes a phase from step 540 to step 5140, includes a phase from step 5401 to step 5100, or includes a phase from step 5401 to step 5140. A specific phase is not limited, and any phase in which a low handover interruption latency for example, a 0-ms handover interruption latency, is implemented is used in embodiments described herein.

The foregoing describes the overall procedure with reference to FIG. 5A, FIG. 5B, and FIG. 5C. The following describes a CHO execution condition and a parameter corresponding to a candidate cell with reference to a CHO mechanism.

In the CHO mechanism, a network device configures one or more candidate cells for a terminal device by using higher layer signaling such as an RRC message. For example, the network device indicates CHO configuration information of one or more candidate cells to the terminal device by using one RRC message or a plurality of RRC messages. A quantity of RRC messages herein is not necessarily in a one-to-one correspondence with a quantity of candidate cells. The network device indicates the CHO configuration information of the one or more candidate cells by using one RRC message, or indicates CHO configuration information of a plurality of candidate cells by using a plurality of RRC messages. This is not limited in embodiments described herein.

The CHO configuration information of the candidate cell includes CHO execution condition information (also referred to as CHO trigger condition information) and the parameter corresponding to the candidate cell.

The CHO execution condition information is understood as trigger condition information used by the terminal device to perform a handover decision. The terminal device determines, based on CHO execution condition information of a candidate cell, whether the candidate cell meets a CHO execution condition. If the candidate cell meets the CHO execution condition, the candidate cell is determined as a target cell. In response to determining that a candidate cell configured by the network device meets the CHO execution condition, the terminal device considers handing over to the candidate cell.

Meeting the CHO execution condition is one of conditions for the terminal device to perform a handover, and does not mean that a candidate cell meets the CHO execution condition, and the terminal device definitely hands over to the candidate cell.

The CHO execution condition information is shared by one or more candidate cells. In other words, in response to there being a plurality of candidate cells, the plurality of candidate cells corresponds to same CHO execution condition information. The CHO execution condition information alternatively is cell-level. In other words, in response to there being a plurality of candidate cells, the plurality of candidate cells have respective corresponding CHO execution condition information.

That the candidate cell meets the CHO execution condition means that signal quality of the candidate cell meets the CHO execution condition corresponding to the candidate cell. The CHO execution condition is a CHO execution condition shared with another candidate cell, or is a CHO execution condition corresponding to the candidate cell. This is not limited in embodiments described herein.

The CHO execution condition information specifically includes a CHO execution event (or trigger event) type and a corresponding threshold.

By way of example but not limitation, the CHO execution event type includes but is not limited to, for example, an event A3, an event A4, an event A5, an event B1, and an event B2. The event A3 specifically being that cell signal quality of a candidate cell is higher than cell signal quality of a serving cell by a preset first threshold. The event A5 is specifically that cell signal quality of a candidate cell is higher than a preset second threshold and cell signal quality of a serving cell is lower than a preset third threshold. For specific descriptions of the events, refer to a prior technology. For brevity, details are not described herein.

The CHO execution condition information includes an indication for the CHO execution event type and an indication for the corresponding threshold.

For example, the parameter corresponding to the candidate cell includes but is not limited to a parameter used by the terminal device to hand over to the candidate cell or a parameter used by the terminal device to perform communication in the candidate cell. In other words, the parameter corresponding to the candidate cell includes a related parameter required by the terminal to hand over (or access) the candidate cell.

For example, the parameter corresponding to the candidate cell includes but is not limited to a C-RNTI allocated by the candidate cell to the terminal device, radio resource information (for example, random access channel (RACH) resource information) of accessing the candidate cell, index information of the candidate cell, frequency information of the candidate cell, a physical layer configuration parameter, a media access control MAC layer configuration parameter, a radio link control RLC layer configuration parameter, a packet data convergence protocol PDCP layer configuration parameter, a service data adaptation protocol SDAP layer configuration parameter, an RRC layer configuration parameter, or bearer configuration information. Optionally, the parameter corresponding to the candidate cell further includes measurement-related information, for example, a measurement identifier (measID) or a measurement frequency.

For example, the index information of the candidate cell includes but is not limited to the measurement-related information (for example, the measurement identifier (measID) and the measurement frequency), and a CHO configuration identifier (CHO-ConfigId) corresponding to the candidate cell. For example, the index information of the candidate cell further includes but is not limited to a CGI of the candidate cell or a PCI of the candidate cell.

For example, the frequency information of the candidate cell includes but is not limited to an absolute frequency of a synchronization signal block (SSB) or an absolute frequency position of a reference resource block (RB). For example, the absolute frequency of the SSB is an information element "absolute frequency SSB (absoluteFrequencySSB)". For example, the reference RB is a common RB (common resource block, CRB) numbered 0, for example, denoted as a CRB 0. For example, the absolute frequency position of the reference RB includes an information element "absolute frequency point A (absoluteFrequencyPointA)", "frequency band list (frequency BandList)", or "subcarrier space (SCS)-specific carrier list (scs-SpecificCarrierList)".

Related descriptions of the absolute frequency point A are as follows: On each carrier, an RB is obtained through division by using 12 consecutive subcarriers as a unit in frequency domain, and a "point A" is used as a common reference point for RB division. A CRB number starts from 0, for example, denoted as the CRB 0. A subcarrier 0 in the CRB 0 corresponds to the point A in a middle point of the frequency domain. The point A is configured by the network device for the terminal device.

For example, the parameter used by the terminal device to perform communication in the candidate cell includes but is not limited to the physical layer configuration parameter, the media access control (MAC) layer configuration parameter, the radio link control (RLC) layer configuration parameter, the packet data convergence protocol (PDCP) layer configuration parameter, the service data adaption protocol (SDAP) layer configuration parameter, the radio resource control (RRC) layer configuration parameter, or the bearer configuration information.

The foregoing enumeration of the CHO configuration information and the parameter corresponding to the candidate cell is merely an example, and does not constitute any limitation on embodiment described herein. At least one embodiment does not exclude a possibility that the CHO configuration information includes other parameters corresponding to the candidate cell than the foregoing enumerated parameters.

Optionally, in the CHO mechanism, data transmission is maintained between a source network device and the terminal device in a time period from a time point at which the terminal device determines the target cell to a time point at which the terminal device successfully hands over to the target cell. In other words, before the terminal device successfully hands over to the target cell (for example, before the terminal device sends an RRC reconfiguration complete message to the successfully accessed target cell), normal data transmission is maintained between the terminal device and the source network device.

Optionally, in the CHO mechanism, after determining the target cell, the terminal device sends a second message to the source network device. Alternatively, after determining the target cell, the terminal device sends a preamble to a target network device, and after the target network device receives the preamble, the target network device sends a third message to the source network device. For the second message and the third message, refer to the descriptions in the method 400 and the method 500.

Optionally, the solutions in the foregoing aspects are also used in the CHO mechanism. The following separately provides brief descriptions.

1. A scenario in which a terminal device no longer maintains data transmission with a source cell is used in a CHO mechanism.

For example, in the CHO mechanism, after determining a target cell, the terminal device maintains data transmission with a source network device in a third preset time period.

For another example, in the CHO mechanism, after determining a target cell, the terminal device starts a timer by using duration of a third preset time period as duration, for example, denoted as T3. In a running phase of the timer T3, the terminal device maintains data transmission with a source network device. The terminal device disconnects data transmission with a source network device in response to the timer T3 stopping or the duration of the third preset time period of the timer T3 expiring. For example, the terminal device releases an RRC connection to the source cell, release an SRB of an MCG, or release an SRB configuration/resource corresponding to a source MCG, or the terminal device releases configuration information corresponding to the source cell (or the source network device or the source MCG). That the terminal device releases configuration information corresponding to the source cell (or the source network device or the source MCG) includes, for example, but is not limited to that the terminal device releases one or more of the following: a C-RNTI allocated by the source cell to the terminal device, a physical layer configuration parameter of the source cell, a media access control MAC layer configuration parameter of the source cell, a radio link control RLC layer configuration parameter of the source cell, a packet data convergence protocol PDCP layer configuration parameter of the source cell, a service data adaptation protocol SDAP layer configuration parameter of the source cell, an RRC layer configuration parameter of the source cell, or bearer configuration information of the source cell.

For another example, after receiving an RRC message that includes CHO configuration information, the terminal device starts a timer T3 by using duration of a third preset time period as duration. In a running phase of the timer T3, the terminal device maintains data transmission with a source network device. The terminal device disconnects data transmission with a source network device in response to the timer T3 stopping or the duration of the third preset time period of the timer T3 expiring.

For another example, after sending an RRC message including CHO configuration information to the terminal device, the source network device starts a timer by using duration of a fourth preset time period as duration, for example, denoted as T4. In a running phase of the timer T4, the source network device maintains data transmission with the terminal device. The source network device disconnects data transmission with the terminal device in response to the timer T4 stopping or the duration of the fourth preset time period of the timer T4 expiring. For example, the source network device disconnects a connection (for example, an RRC connection or a user plane connection) to the terminal device. For example, the source cell (or the source network device or the source MCG) disconnects an RRC connection to the terminal device, release an SRB of the source master cell group MCG, or release an SRB configuration/resource corresponding to the source MCG, or the source cell (or the source network device or the source MCG) releases configuration information allocated by the source cell to the terminal device. That the source cell (or the source network device or the source MCG) releases configuration information allocated by the source cell to the terminal device includes, for example, but is not limited to that the source cell (or the source network device or the source MCG) releases one or more of the following: a C-RNTI allocated by the source cell to the terminal device, a physical layer configuration parameter of the source cell, a media access control MAC layer configuration parameter of the source cell, a radio link control RLC layer configuration parameter of the source cell, a packet data convergence protocol PDCP layer configuration parameter of the source cell, a service data adaptation protocol SDAP layer configuration parameter of the source cell, an RRC layer configuration parameter of the source cell, or bearer configuration information of the source cell.

For the third preset time period, the fourth preset time period, the timer T3, and the timer T4, refer to the descriptions in the foregoing aspect 1. For example, for the third preset time period and the fourth preset time period, refer to the foregoing first preset time period and the foregoing second preset time period. For the timer T3 and the timer T4, refer to the foregoing timer T1 and the foregoing timer T2.

2. A manner of processing a radio bearer by a terminal device is used in a CHO mechanism.

For example, in the CHO mechanism, in response to a CHO execution condition being met (in other words, after the terminal device determines a target cell), the terminal device reestablishes an SRB, and the SRB obtained after the reestablishment is mapped to (or associated with) a target MCG. In addition, the terminal device maintains an SRB configuration corresponding to a source MCG.

For another example, in the CHO mechanism, in response to a CHO execution condition being met (in other words, after the terminal device determines a target cell), the terminal device establishes an SRB corresponding to a target MCG. In addition, the terminal device suspends an SRB corresponding to a source MCG.

For details, refer to the descriptions in the foregoing aspect 2.

3. A possible processing manner used by a terminal device after a handover of the terminal device fails is used in a CHO mechanism.

Processing manner 1: If no RLF occurs on a source network device, the terminal device maintains data transmission with the source network device.

Processing manner 2: The terminal device continues to determine whether another candidate cell meets a CHO execution condition.

Processing manner 3: The terminal device performs cell selection.

Processing manner 4: In response to an RLF occurring on a source network device, the terminal device performs cell selection, or the terminal device initiates a reestablishment procedure.

For the foregoing processing manners, refer to the descriptions in the foregoing aspect 3.

4. A manner in which a terminal device selects a target cell is used in a CHO mechanism.

For details, refer to the descriptions in the foregoing aspect 4.

5. A case in which a terminal device releases CHO configuration information of a candidate cell is used in a CHO mechanism.

Case 1: In response to a handover succeeding, the terminal device releases the CHO configuration information.

Case 2: In response to a network device indicating the terminal device to cancel a CHO procedure or release the CHO configuration information, the terminal device releases the CHO configuration information.

Case 3: In response to the terminal device initiating a reestablishment procedure, the terminal device releases the CHO configuration information.

In other words, in response to reestablishment succeeding or reestablishment failing, the terminal device releases the CHO configuration information.

Case 4: In response to the terminal device falling back to a source cell (for example, in response to the terminal device fails to access the target cell, if no RLF occurs in the source cell, the terminal device falls back to the source cell), the terminal device releases the CHO configuration information.

For the foregoing cases, refer to the descriptions in the foregoing aspect 5.

Optionally, in the CHO mechanism, the source network device sends a message #A to a candidate network device (or a target network device), and forward data.

For example, after sending the CHO configuration information to the terminal device, the source network device sends the $1^{st}$ message #A to the candidate network device. For another example, the terminal device sends a preamble to the target network device. After receiving the preamble, the target network device sends a third message to the source network device, and then the source network device sends the 1 message #A to the target network device based on the third message. For another example, after determining the target cell (or the target network device), the terminal device sends a second message to the source network device, and the source network device sends the 1 message #A to the target network device based on the second message.

Further, for example, after the source network device sends the 1 message #A to the candidate network device or the target network device, the source network device further sends one or more messages #A to the candidate network device or the target network device before the source network device sends a SN status transfer message to the target network device.

For detailed descriptions of the message #A and data forwarding, refer to the descriptions in the methods 400 and 500.

The foregoing describes the handover mechanism provided in embodiments described herein, that is, considers a handover latency and handover reliability, for example, a "CHO+DAPS" handover manner, and further describes the CHO mechanism. For a DAPS handover, a timer is also introduced into the DAPS handover in embodiments described herein.

For example, in a DAPS handover solution, a message (for example, an RRC reconfiguration message, where the RRC reconfiguration message includes indication information used to indicate the terminal device to perform DAPS handover) used to indicate the terminal device to perform DAPS handover includes related information (for example, valid duration of a timer T5 and/or valid duration of a timer T6) of the timer T5 and/or the timer T6. For the duration of the timer T5 and the duration of the timer T6, refer to the first preset time period and the second preset time period in the foregoing aspect 1.

For example, the terminal device maintains data transmission with the source cell during running of the timer T5. The terminal device disconnects data transmission from the source cell in response to the timer T5 stops or expires. For example, the terminal device releases an RRC connection to the source cell, release an SRB of an MCG, or release an SRB configuration/resource corresponding to a source MCG, or the terminal device releases configuration information corresponding to the source cell (or a source network device or the source MCG). That the terminal device releases configuration information corresponding to the source cell (or a source network device or the source MCG) includes, for example, but is not limited to that the terminal device releases one or more of the following: a C-RNTI allocated by the source cell to the terminal device, a physical layer configuration parameter of the source cell, a media access control MAC layer configuration parameter of the source cell, a radio link control RLC layer configuration parameter of the source cell, a packet data convergence protocol PDCP layer configuration parameter of the source cell, a service data adaptation protocol SDAP layer configuration parameter of the source cell, an RRC layer configuration parameter of the source cell, or bearer configuration information of the source cell.

A moment at which the terminal device starts the timer T5 is one of the following: a moment at which the terminal device receives an RRC reconfiguration message, a moment at which the terminal device sends a preamble, a moment at which the terminal device receives an RAR message, a moment at which the terminal device receives a contention resolution message, a moment at which the terminal device sends an RRC reconfiguration complete message, or the like.

For another example, the source cell maintains data transmission with the terminal device during running of the timer T6. The source cell disconnects data transmission with the terminal device in response to the timer T6 stopping or expiring. For example, the source cell disconnects an RRC connection to the terminal device, release an SRB of a source master cell group MCG, or release an SRB configuration/resource corresponding to the source MCG, or the source cell (or a source network device or the source MCG) releases configuration information allocated by the source cell to the terminal device. That the source cell (or a source network device or the source MCG) releases configuration information allocated by the source cell to the terminal device includes, for example, but is not limited to that the source cell (or the source network device or the source MCG) releases one or more of the following: a C-RNTI allocated by the source cell to the terminal device, a physical layer configuration parameter of the source cell, a media access control MAC layer configuration parameter of the source cell, a radio link control RLC layer configuration parameter of the source cell, a packet data convergence protocol PDCP layer configuration parameter of the source cell, a service data adaptation protocol SDAP layer configuration parameter of the source cell, an RRC layer configuration parameter of the source cell, or bearer configuration information of the source cell.

A moment at which the source cell starts the timer T6 is one of the following: a moment at which the source cell sends an RRC reconfiguration message to the terminal device, a moment at which the source cell receives a third message, or a moment at which the source cell receives a handover success message sent by a target cell.

After receiving the preamble sent by the terminal device, the target cell sends the third message to the source cell. For the third message, refer to the descriptions in the method 400 or the method 500.

Names of the messages in the foregoing embodiments do not limit the protection scope of embodiments described herein. For example, in a future protocol, a name used to indicate a function similar to that of the handover success message, a name used to indicate a function similar to that of the early forwarding transfer message, or the like is applicable to embodiments described herein.

A form of the indication information such as the first indication information or the second indication information in the foregoing embodiments is not limited in embodiments described herein. For example, the indication information is a Boolean value, a binary value, an information element, or in another form.

The "cell" such as the source cell, the target cell, or the candidate cell is used as an example for description, and a person skilled in the art understands meanings of the "cell". The source cell and the target cell are used as an example.

The "source cell" is replaced with a "network device to which the source cell belongs", and the "target cell" is replaced with a "network device to which the target cell belongs".

A plurality of timers are enumerated in the foregoing embodiments, for example, the timer T1, the timer T2, the timer T3, the timer T4, the timer T5, and the timer T6. Duration of each timer is not limited. For example, duration of each timer is separately set.

Based on the foregoing technical solutions, before the terminal device needs to perform a handover, the terminal device obtains information about a plurality of candidate cells, so that the terminal device selects the target cell from the candidate cells in response to the terminal device performing the handover. In this manner, a handover success rate is improved, long-time communication interruption is avoided, and user experience is improved. In addition, in a handover process, the terminal device maintains an RRC connection/data transmission with the source cell. Therefore, data transmission of the terminal device is also ensured in the handover process, an interruption latency in the handover process is reduced, and performance of a communication system and user experience are improved.

Embodiments described in this specification are independent solutions, or are combined based on internal logic, and fall within the protection scope of the embodiments described herein. For example, in the handover process, data transmission is maintained between the terminal device and the source network device by using the solution in the aspect 1, and CHO configuration information is released by using the solution in the aspect 5. For another example, the solutions in the method 400, for example, the solutions in the aspect 1 to the aspect 5, is used in the method 500.

The methods and the operations implemented by the terminal device in the foregoing method embodiments are alternatively implemented by a component (for example, a chip or a circuit) that is used in the terminal device, and the methods and the operations implemented by the network device in the foregoing method embodiments alternatively are implemented by a component (for example, a chip or a circuit) that is used in the network device.

The foregoing describes in detail the methods provided in embodiments described herein with reference to FIG. 4 and FIG. 5A, FIG. 5B, and FIG. 5C. The following describes in detail apparatuses provided in embodiments described herein with reference to FIG. 6 to FIG. 9. Descriptions of the apparatus embodiments correspond to the descriptions of the method embodiments. Therefore, for content that is not described in detail, refer to the foregoing method embodiments.

The foregoing mainly describes the solutions provided in embodiments described herein from the perspective of interaction between network elements. To implement the foregoing functions, each network element, for example, the source network device, the target network device, or the terminal device, includes corresponding hardware structures and/or software modules for performing the functions. A person skilled in the art is aware that, with reference to the examples described in embodiments disclosed in this specification, units and algorithm steps is implemented by hardware or a combination of computer software and hardware in at least one embodiment. Whether a function is performed by hardware or hardware driven by computer software depends on particular applications and design constraints of the technical solutions. A person skilled in the art uses different methods to implement the described functions for each particular application, but the embodiments described herein provide a description of the scope of protections of the methods.

In embodiments described herein, functional modules of the source network device, the target network device, or the terminal device is obtained through division based on the foregoing method examples. For example, each functional module is obtained through division based on a corresponding function, or two or more functions is integrated into one processing module. The integrated module is implemented in a form of hardware, or is implemented in a form of a software functional module. In at least one embodiment, division into the modules is an example, and is merely logical function division. During actual implementation, another available division manner is used. An example in which each functional module is obtained through division based on a corresponding function is used below for description.

Figure 6:
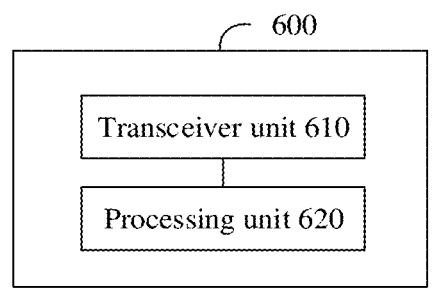
FIG. 6 is a schematic diagram of a handover apparatus according to at least one embodiment.

FIG. 6 is a schematic block diagram of a communication apparatus according to at least one embodiment. The communication apparatus 600 includes a transceiver unit 610 and a processing unit 620. The transceiver unit 610 implements a corresponding communication function, and the processing unit 620 is configured to process data. The transceiver unit 610 is also referred to as a communication interface or a communication unit.

Optionally, the communication apparatus 600 further includes a storage unit. The storage unit is configured to store instructions and/or data. The processing unit 620 reads the instructions and/or the data in the storage unit, so that the communication apparatus implements the foregoing method embodiments.

The communication apparatus 600 is configured to perform actions performed by the terminal device in the foregoing method embodiments. In this case, the communication apparatus 600 is a terminal device or a component that is configured in the terminal device. The transceiver unit 610 is configured to perform transceiver-related operations on a terminal device side in the foregoing method embodiments. The processing unit 620 is configured to perform processing-related operations on the terminal device side in the foregoing method embodiments.

Alternatively, the communication apparatus 600 is configured to perform actions performed by a network device (for example, a source cell or a network device to which the source cell belongs; for another example, a target cell or a network device to which the target cell belongs) in the foregoing method embodiments. In this case, the communication apparatus 600 is the network device or a component that is configured in the network device. The transceiver unit 610 is configured to perform transceiver-related operations on a network device side in the foregoing method embodiments. The processing unit 620 is configured to perform processing-related operations on the network device side in the foregoing method embodiments.

In a design, the communication apparatus 600 is configured to perform actions performed by the terminal device in the embodiment shown in FIG. 4. The transceiver unit 610 is configured to receive a first message, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0. The processing unit 620 is configured to perform a handover from a source cell to a target cell, where the target cell belongs to the N candidate cells. The communication apparatus 600 maintains data transmission with the source cell in a process of the handover from the source cell to the target cell.

Optionally, the communication apparatus 600 maintains data transmission with the source cell during running of a timer. The communication apparatus 600 disconnects data transmission with the source cell in response to the timer stopping.

Optionally, a moment of starting the timer is one of the following: a moment of receiving the first message, a moment of determining the target cell, a moment of sending, to the source cell, information indicating the target cell, a moment of sending a preamble to the target cell, a moment of receiving a random access response message, a moment of receiving a contention resolution message, or a moment of sending a radio resource control RRC reconfiguration complete message to the target cell.

Optionally, the processing unit 620 is configured to: determine the target cell from the N candidate cells; and generate a radio bearer corresponding to the target cell, and maintain a radio bearer configuration corresponding to the source cell.

Optionally, the communication apparatus 600 maintains data transmission with the source cell in response to the handover from the source cell to the target cell failing and no radio link failure occurring in the source cell.

Optionally, the processing unit 620 is configured to initiate a reestablishment procedure in response to the radio link failure occurring in the source cell.

Optionally, in response to the radio link failure occurring in the source cell, the processing unit 620 is configured to: perform cell selection, and in response to the selected cell belonging to the N candidate cells, attempt to hand over to the selected cell; determine whether there is a cell that meets a CHO execution condition in the N2 candidate cells, and in response to the cell that meets the CHO execution condition being determined, attempt to hand over to the determined cell that meets the CHO execution condition; perform cell selection, and in response to a selected cell not belonging to the N candidate cells, initiate a reestablishment procedure; or determine whether there is a cell that meets a CHO execution condition in the N2 candidate cells, and in response to there being no cell that meets the CHO execution condition in the N2 candidate cells, initiate a reestablishment procedure.

Optionally, in response to the handover from the source cell to the target cell failing, the processing unit 620 is configured to: perform cell selection, and in response to a selected cell belonging to the N candidate cells, attempt to hand over to the selected cell; determine whether there is a cell that meets a CHO execution condition in the N2 candidate cells, and in response to the cell that meets the CHO execution condition being determined, attempt to hand over to the determined cell that meets the CHO execution condition; perform cell selection, and in response to a cell selected through the cell selection not belonging to the N candidate cells, initiate a reestablishment procedure; or determine whether there is a cell that meets a CHO execution condition in the N2 candidate cells, and in response to there being no cell that meets the CHO execution condition in the N2 candidate cells, initiate a reestablishment procedure.

Optionally, the processing unit 620 is configured to preferentially hand over from the source cell to a first cell, where the first cell belongs to the N1 candidate cells.

Optionally, in response to the handover from the source cell to the first cell failing, the processing unit 620 is configured to: maintain data transmission with the source cell in response to no radio link failure occurring in the source cell; attempt to hand over to a cell other than the first cell in the N1 candidate cells; perform cell selection, and in response to a selected cell belonging to the N candidate cells, attempt to hand over to the selected cell; determine whether there is a cell that meets a CHO execution condition in the N2 candidate cells, and in response to the cell that meets the CHO execution condition being determined, attempt to hand over to the determined cell that meets the CHO execution condition; perform cell selection, and in response to a selected cell not belonging to the N candidate cells, initiate a reestablishment procedure; or determine whether there is a cell that meets a CHO execution condition in the N2 candidate cells, and in response to there being no cell that meets the CHO execution condition in the N2 candidate cells, initiate a reestablishment procedure.

Optionally, information about the N2 candidate cells includes CHO configuration information of the N2 candidate cells, and the CHO configuration information of the N2 candidate cells includes the CHO execution condition information and a parameter corresponding to each of the N2 candidate cells.

Optionally, the parameter corresponding to the candidate cell includes one or more of the following: a cell radio network temporary identifier C-RNTI allocated by the candidate cell to a terminal device, random access channel RACH resource information for accessing the candidate cell, index information corresponding to the candidate cell, a cell global identifier CGI of the candidate cell, a physical cell identifier PCI of the candidate cell, frequency information corresponding to the candidate cell, a physical layer configuration parameter, a media access control MAC layer configuration parameter, a radio link control RLC layer configuration parameter, a packet data convergence protocol PDCP layer configuration parameter, a service data adaptation protocol SDAP layer configuration parameter, an RRC layer configuration parameter, or bearer configuration information.

Optionally, the CHO configuration information of the N2 candidate cells is released in one of the following cases: in response to the reestablishment procedure being triggered; in response to the reestablishment procedure succeeding; in response to the reestablishment procedure failing; or in response to the handover from the source cell to the target cell failing and the terminal device continuing to stay in the source cell.

Optionally, the transceiver unit 610 is further configured to send a second message, where the second message is used to indicate the source cell to send an early forwarding transfer message to the target cell, and/or the second message is used to indicate the source cell to forward data to the target cell.

In another design, the communication apparatus 600 is configured to perform actions performed by the network device (for example, the source cell or the network device to which the source cell belongs) in the embodiment shown in FIG. 4. The transceiver unit 610 is configured to send a first message, where the first message includes information about N candidate cells, the N candidate cells include N1 candidate cells and N2 candidate cells, the N1 candidate cells include a cell for which no conditional handover CHO execution condition information is configured, the N2 candidate cells include a cell for which the CHO execution condition information is configured, N and N2 are integers greater than 1 or equal to 1, and N1 is an integer greater than 0 or equal to 0. The communication apparatus 600 maintains data transmission with a terminal device in a process in which the terminal device hands over from a source cell to a target cell, where the target cell belongs to the N candidate cells.

Optionally, the transceiver unit 610 is configured to receive a second message sent by the terminal device, where the second message is used to indicate to send an early forwarding transfer message to the target cell, and/or the second message is used to indicate to forward data to the target cell.

Optionally, the transceiver unit 610 is configured to receive a third message sent by the target cell, where the third message is used to indicate to send an early forwarding transfer message to the target cell, and/or the third message is used to indicate to forward data to the target cell.

Optionally, the communication apparatus 600 maintains data transmission with the terminal device during running of a timer. The communication apparatus 600 disconnects data transmission with the terminal device in response to the timer stopping.

Optionally, a moment of starting the timer is one of the following: a moment of sending the first message, a moment of receiving the second message, a moment of receiving the third message, or after a handover success message sent by the target cell is received; the second message is used to indicate to send the early forwarding transfer message to the target cell, and/or the second message is used to indicate to forward the data to the target cell; and the third message is used to indicate to send the early forwarding transfer message to the target cell, and/or the third message is used to indicate to forward the data to the target cell.

Optionally, information about the N2 candidate cells includes CHO configuration information of the N2 candidate cells, and the CHO configuration information of the N2 candidate cells includes the CHO execution condition information and a parameter corresponding to each of the N2 candidate cells.

Optionally, the parameter corresponding to the candidate cell includes one or more of the following: a cell radio network temporary identifier C-RNTI allocated by the candidate cell to a terminal device, random access channel RACH resource information for accessing the candidate cell, index information corresponding to the candidate cell, a cell global identifier CGI of the candidate cell, a physical cell identifier PCI of the candidate cell, frequency information corresponding to the candidate cell, a physical layer configuration parameter, a media access control MAC layer configuration parameter, a radio link control RLC layer configuration parameter, a packet data convergence protocol PDCP layer configuration parameter, a service data adaptation protocol SDAP layer configuration parameter, a radio resource control RRC layer configuration parameter, or bearer configuration information.

The processing unit 620 in the foregoing embodiment is implemented by at least one processor or a processor-related circuit. The transceiver unit 610 is implemented by a transceiver or a transceiver-related circuit. The transceiver unit 610 is also referred to as a communication unit or a communication interface. The storage unit is implemented by at least one memory.

Figure 7:
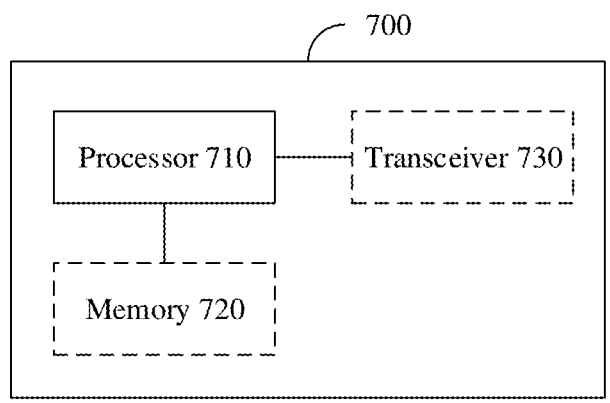
FIG. 7 is a schematic diagram of a handover apparatus according to at least one embodiment.

As shown in FIG. 7, at least one embodiment further provides a communication apparatus 700. The communication apparatus 700 includes a processor 710. The processor 710 is coupled to a memory 720. The memory 720 is configured to store a computer program or instructions and/or data. The processor 710 is configured to execute the computer program or the instructions and/or data stored in the memory 720, so that the methods in the foregoing method embodiments are performed.

Optionally, the communication apparatus 700 includes one or more processors 710.

Optionally, as shown in FIG. 7, the communication apparatus 700 further includes the memory 720.

Optionally, the communication apparatus 700 includes one or more memories 720.

Optionally, the memory 720 and the processor 710 is integrated together, or disposed separately.

Optionally, as shown in FIG. 7, the communication apparatus 700 further includes a transceiver 730, and the transceiver 730 is configured to receive and/or send a signal. For example, the processor 710 is configured to control the transceiver 730 to receive and/or send a signal.

In a solution, the communication apparatus 700 is configured to implement operations performed by the terminal device in the foregoing method embodiments.

For example, the processor 710 is configured to implement processing-related operations performed by the terminal device in the foregoing method embodiments, and the transceiver 730 is configured to implement transceiver-related operations performed by the terminal device in the foregoing method embodiments.

In another solution, the communication apparatus 700 is configured to implement operations performed by the source network device (a source cell or a network device to which the source cell belongs) in the foregoing method embodiments.

For example, the processor 710 is configured to implement processing-related operations performed by the source network device in the foregoing method embodiments, and the transceiver 730 is configured to implement transceiver-related operations performed by the source network device in the foregoing method embodiments.

In another solution, the communication apparatus 700 is configured to implement operations performed by the target network device (a target cell or a network device to which the target cell belongs) in the foregoing method embodiments.

For example, the processor 710 is configured to implement processing-related operations performed by the target network device in the foregoing method embodiments, and the transceiver 730 is configured to implement transceiver-related operations performed by the target network device in the foregoing method embodiments.

At least one embodiment further provides a communication apparatus 800. The communication apparatus 800 is a terminal device or a chip. The communication apparatus 800 is configured to perform operations performed by the terminal device in the foregoing method embodiments.

Figure 8:
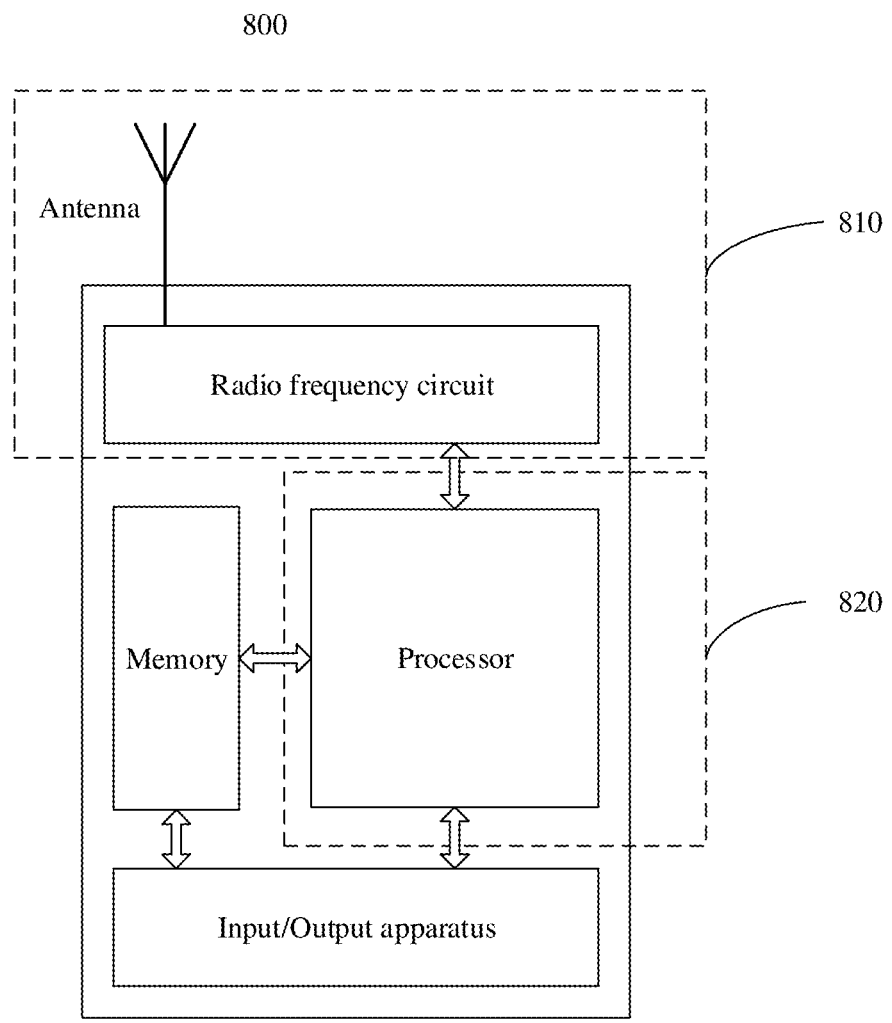
FIG. 8 is a schematic diagram of a handover apparatus according to at least one embodiment.

In response to the communication apparatus 800 being a terminal device, FIG. 8 is a simplified schematic diagram of a structure of the terminal device according to at least one embodiment. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in an electromagnetic wave. The input/output apparatus, such as a touchscreen, a display screen, and a keyboard, is mainly configured to: receive data input by a user and output data to the user. Terminal devices of some types have no input/output apparatus.

In response to data being sent, the processor performs baseband processing on the to-be-sent data, and outputs a baseband signal to the radio frequency circuit. The radio frequency circuit performs radio frequency processing on the baseband signal and then sends a radio frequency signal to the outside in an electromagnetic wave form through the antenna. In response to data being sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows one memory and one processor. In an actual terminal device product, there is one or more processors and one or more memories. The memory also is referred to as a storage medium, a storage device, or the like. The memory is disposed independent of the processor, or is integrated with the processor. This is not limited in this embodiment described herein.

In at least one embodiment, the antenna and the radio frequency circuit that have sending and receiving functions is considered as a transceiver unit of the terminal device, and the processor that has a processing function is considered as a processing unit of the terminal device.

As shown in FIG. 8, the terminal device includes a transceiver unit 810 and a processing unit 820. The transceiver unit 810 also is referred to as a transceiver, a transceiver machine, a transceiver apparatus, or the like. The processing unit 820 is also referred to as a processor, a processing board, a processing module, a processing apparatus, or the like.

Optionally, a component for implementing a receiving function in the transceiver unit 810 is considered as a receiving unit, and a component for implementing a sending function in the transceiver unit 810 is considered as a sending unit. In other words, the transceiver unit 810 includes the receiving unit and the sending unit. The transceiver unit also is sometimes referred to as a transceiver machine, a transceiver, a transceiver circuit, or the like. The receiving unit also is sometimes referred to as a receiver machine, a receiver, a receiver circuit, or the like. The sending unit also is sometimes referred to as a transmitter machine, a transmitter, a transmitter circuit, or the like.

For example, In an implementation, the processing unit 820 is configured to perform a processing action on a terminal device side in FIG. 4. For example, the processing unit 820 is configured to perform processing steps in step 420 and step 430 in FIG. 4, and the transceiver unit 810 is configured to perform receiving and sending operations in step 410 and step 430 in FIG. 4.

For another example, In an implementation, the processing unit 820 is configured to perform processing steps in step 540 and step 570 in FIG. 5A, FIG. 5B, and FIG. 5C, and the transceiver unit 810 is configured to perform receiving and sending operations in step 530, step 5401, step 550, and step 580 in FIG. 5A, FIG. 5B, and FIG. 5C.

FIG. 8 is merely an example instead of a limitation. The terminal device including the transceiver unit and the processing unit does not depend on the structure shown in FIG. 8.

In response to the communication apparatus 800 being a chip, the chip includes a transceiver unit and a processing unit. The transceiver unit is an input/output circuit or a communication interface. The processing unit is a processor, a microprocessor, or an integrated circuit that is integrated on the chip.

At least one embodiment further provides a communication apparatus 900. The communication apparatus 900 is a network device or a chip. The communication apparatus 900 is configured to perform operations performed by the network device (for example, a source cell or a network device to which the source cell belongs; for another example, a target cell or a network device to which the target cell belongs) in the foregoing method embodiments.

Figure 9:
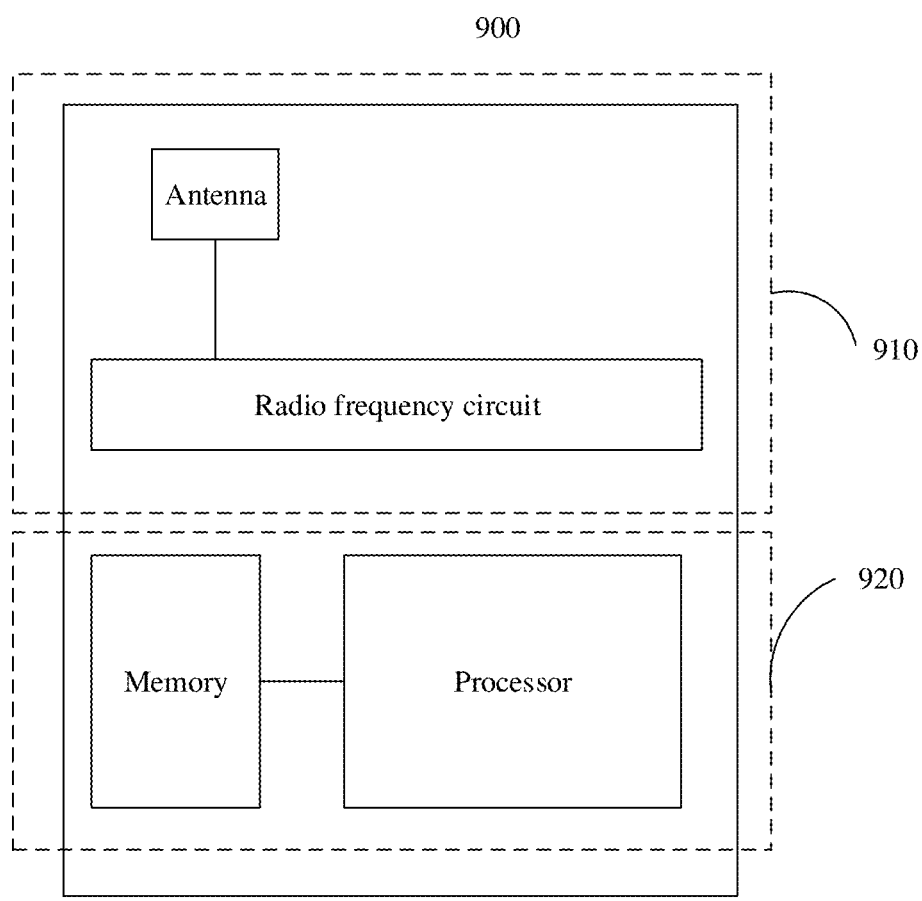
FIG. 9 is a schematic diagram of a handover apparatus according to at least one embodiment.

In response to the communication apparatus 900 being a network device, for example, a base station, FIG. 9 is a simplified schematic diagram of a structure of the base station. The base station includes a part 910 and a part 920. The part 910 is mainly configured to: send and receive a radio frequency signal, and perform conversion between the radio frequency signal and a baseband signal. The part 920 is mainly configured to: perform baseband processing, control the base station, and the like. The part 910 is usually referred to as a transceiver unit, a transceiver machine, a transceiver circuit, a transceiver, or the like. The part 920 is usually a control center of the base station, is usually referred to as a processing unit, and is configured to control the base station to perform processing operations on a network device side in the foregoing method embodiments.

The transceiver unit in the part 910 also is referred to as a transceiver, a transceiver machine, or the like, and includes an antenna and a radio frequency circuit. The radio frequency circuit is mainly configured to perform radio frequency processing. Optionally, a component for implementing a receiving function in the part 910 is considered as a receiving unit, and a component for implementing a sending function is considered as a sending unit. In other words, the part 910 includes the receiving unit and the sending unit. The receiving unit also is referred to as a receiver machine, a receiver, a receiver circuit, or the like. The sending unit is referred to as a transmitter machine, a transmitter, a transmitter circuit, or the like.

The part 920 includes one or more boards, and each board includes one or more processors and one or more memories. The processor is configured to read and execute a program in the memory to implement a baseband processing function and control the base station. If there are a plurality of boards, the boards is interconnected to enhance a processing capability. In an optional implementation, a plurality of boards share one or more processors, a plurality of boards share one or more memories, or a plurality of boards simultaneously share one or more processors.

For example, In an implementation, the network device is a source cell or a network device to which the source cell belongs, the transceiver unit in the part 910 is configured to perform transceiver-related steps performed by the source cell or the network device to which the source cell belongs in the embodiment shown in FIG. 4, and the part 920 is configured to perform processing-related steps performed by the source cell or the network device to which the source cell belongs in the embodiment shown in FIG. 4.

For example, in another implementation, the network device is a source cell or a network device to which the source cell belongs, the transceiver unit in the part 910 is configured to perform transceiver-related steps performed by the source cell or the network device to which the source cell belongs in the embodiment shown in FIG. 5A, FIG. 5B, and FIG. 5C, and the part 920 is configured to perform processing-related steps performed by the source cell or the network device to which the source cell belongs in the embodiment shown in FIG. 5A, FIG. 5B, and FIG. 5C.

For another example, In an implementation, the network device is a target cell or a network device to which the target cell belongs, the transceiver unit in the part 910 is configured to perform transceiver-related steps performed by the target cell or the network device to which the target cell belongs in the embodiment shown in FIG. 4, and the part 920 is configured to perform processing-related steps performed by the target cell or the network device to which the target cell belongs in the embodiment shown in FIG. 4.

For another example, in another implementation, the network device is a target cell or a network device to which the target cell belongs, the transceiver unit in the part 910 is configured to perform transceiver-related steps performed by the target cell or the network device to which the target cell belongs in the embodiment shown in FIG. 5A, FIG. 5B, and FIG. 5C, and the part 920 is configured to perform processing-related steps performed by the target cell or the network device to which the target cell belongs in the embodiment shown in FIG. 5A, FIG. 5B, and FIG. 5C.

FIG. 9 is merely an example instead of a limitation. The network device including the transceiver unit and the processing unit does not depend on the structure shown in FIG. 9.

In response to the communication apparatus 900 being a chip, the chip includes a transceiver unit and a processing unit. The transceiver unit is an input/output circuit or a communication interface. The processing unit is a processor, a microprocessor, or an integrated circuit that is integrated on the chip.

At least one embodiment further provides a computer-readable storage medium. The computer-readable storage medium stores computer instructions used to implement the method performed by the terminal device or the method performed by the network device (for example, a source cell or a network device to which the source cell belongs; for another example, a target cell or a network device to which the target cell belongs) in the foregoing method embodiments.

For example, in response to the computer instructions being executed by a computer, the computer is enabled to implement the method performed by the terminal device or the method performed by the network device (for example, the source cell or the network device to which the source cell belongs; for another example, the target cell or the network device to which the target cell belongs) in the foregoing method embodiments.

At least one embodiment further provides a computer program product including instructions. In response to the instructions being executed by a computer, the computer is enabled to implement the method performed by the terminal device or the method performed by the network device (for example, a source cell or a network device to which the source cell belongs; for another example, a target cell or a network device to which the target cell belongs) in the foregoing method embodiments.

At least one embodiment further provides a communication system. The communication system includes the network device and the terminal device in the foregoing embodiments.

In an example, the communication system includes the source network device and the terminal device in the embodiment described above with reference to FIG. 4 or FIG. 5A, FIG. 5B, and FIG. 5C.

In another example, the communication system includes the target network device and the terminal device in the embodiment described above with reference to FIG. 4 or FIG. 5A, FIG. 5B, and FIG. 5C.

In still another example, the communication system includes the source network device, the target network device, and the terminal device in the embodiment described above with reference to FIG. 4 or FIG. 5A, FIG. 5B, and FIG. 5C.

For explanations and beneficial effects of related content of any of the communication apparatuses provided above, refer to the corresponding method embodiment provided above. Details are not described herein again.

In at least one embodiment, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). An operating system of the operating system layer is any one or more computer operating systems that implement service processing by using a process, for example, a Linux operating system, a Unix operating system, an Android operating system, an iOS operating system, or a Windows operating system. The application layer includes applications such as a browser, an address book, word processing software, and instant messaging software.

A specific structure of an execution body of the method provided in at least one embodiment is not specifically limited, provided that a program that records code of the method provided in at least one embodiment is run to perform communication according to the method described herein. For example, the method provided in at least one embodiment is performed by the terminal device or the network device, or is performed by a functional module that is in the terminal device or the network device and that involves and executes a program.

Aspects or features of at least one embodiment is implemented as a method, an apparatus, or a product that uses programming and/or engineering technologies. The term "product" covers a computer program that is accessed from any computer-readable component, carrier or medium. For example, a computer-readable medium includes but is not limited to: a magnetic storage component (for example, a hard disk, a floppy disk or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this specification indicates one or more devices and/or other machine-readable media that are configured to store information. The term "machine-readable media" includes but is not limited to a radio channel and various other media that stores, includes, and/or carries instructions and/or data.

The processor mentioned in embodiments is a central processing unit (CPU), or is another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor is a microprocessor, or the processor is any type of processor or the like.

The memory mentioned in at least one embodiment is a volatile memory or a nonvolatile memory, or includes a volatile memory and a nonvolatile memory. The nonvolatile memory is a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM). For example, the RAM is used as an external cache. By way of example but not limitation, the RAM includes the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

In response to the processor being a general-purpose processor, a DSP, an ASIC, an FPGA, another programmable logic device, a discrete gate or a transistor logic device, or a discrete hardware component, the memory (storage module) is integrated into the processor.

The memory described in this specification is intended to include, but is not limited to, these memories and any other memory of a suitable type.

A person of ordinary skill in the art is aware that, with reference to the examples described in embodiments disclosed in this specification, units and steps is implemented by electronic hardware or a combination of computer software and electronic hardware. Whether the functions are performed by hardware or software depends on particular applications and design constraints of the technical solutions. A person skilled in the art is able to use different methods to implement the described functions, but the implementation goes beyond the scope embodiments described herein.

A person skilled in the art that, for the purpose of convenient and brief description, for a detailed working process of the foregoing apparatus and unit, refers to a corresponding process in the foregoing method embodiments. Details are not described herein again.

In at least one embodiment, the apparatus and method is implemented in another manner. For example, the described apparatus embodiments are merely examples. For example, division into the units is merely logical function division. During actual implementation, another division manner is used. For example, a plurality of units or components is combined or integrated into another system, or some features is ignored or not performed. In addition, the displayed or discussed mutual couplings or direct couplings or communication connections is implemented through some interfaces. The indirect couplings or communication connections between the apparatuses or the units is implemented in electrical, mechanical, or other forms.

The units described as separate parts may or may not be physically separate, and parts displayed as units may or may not be physical units, is located in one place, or is distributed on a plurality of network units. Some or all of the units is selected based on actual implementation of embodiments described herein.

In addition, functional units in at least one embodiment is integrated into one unit, or each of the units exists alone physically, or two or more units is integrated into one unit.

All or some of the foregoing embodiments is implemented by using software, hardware, firmware, or any combination thereof. In response to software being used to implement embodiments, all or some of the embodiments are implemented in a form of a computer program product. The computer program product includes one or more computer instructions. In response to the computer program instructions being loaded and executed on a computer, the procedures or functions according to at least one embodiment are all or partially generated. The computer is a general-purpose computer, a dedicated computer, a computer network, or another programmable apparatus. For example, the computer is a personal computer, a server, a network device, or the like. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible to the computer, or a data storage device, such as a server or a data center, integrating one or more usable media. The usable medium is a magnetic medium (for example, a floppy disk, a hard disk, or a magnetic tape), an optical medium (for example, a DVD), a semiconductor medium (for example, a solid state disk ((SSD)), or the like. For example, the usable medium includes but is not limited to any medium that stores program code, such as a USB flash drive, a removable hard disk, a read-only memory (read-only memory, ROM), a random access memory (RAM), a magnetic disk, or an optical disc.

The foregoing descriptions are merely specific implementations of at least one embodiment, but are not intended to limit the protection scope of embodiments described herein. Any variation or replacement readily figured out by a person skilled in the art within the technical scope disclosed in at least one embodiment falls within the protection scope of embodiments described here. Therefore, the protection scope of embodiments described here are subject to the protection scope described herein.

What is claimed is:

1. A handover method, comprising:
   receiving a first message, wherein
   the first message includes information about N candidate cells,
   the N candidate cells comprise N1 candidate cells and N2 candidate cells,
   the N1 candidate cells are cells for which no conditional handover (CHO) execution condition information is configured,
   the N2 candidate cells are cells for which the CHO execution condition information is configured,
   N and N2 are integers greater than 1 or equal to 1, and
   N1 is an integer greater than 0 or equal to 0; and
   performing a handover from a source cell to a target cell, wherein the target cell belongs to the N candidate cells, and maintaining data transmission with the source cell in a process of the handover from the source cell to the target cell,
   wherein the performing the handover from the source cell to the target cell includes:
   preferentially handing over from the source cell to a first cell, wherein the first cell belongs to the N1 candidate cells.

2. The method according to claim 1, wherein the maintaining the data transmission with the source cell includes:
- maintaining the data transmission with the source cell during running of a timer; and
- disconnecting the data transmission with the source cell in response to the timer stopping.

3. The method according to claim 2, wherein a moment of starting the timer is one of the following:
- a moment of receiving the first message,
- a moment of determining the target cell,
- a moment of sending, to the source cell, information indicating the target cell,
- a moment of sending a preamble to the target cell,
- a moment of receiving a random access response message,
- a moment of receiving a contention resolution message,
- a moment of sending a radio resource control (RRC) reconfiguration complete message to the target cell, or
- a moment of sending a second message to the source cell, wherein the second message indicates the source cell to send an early forwarding transfer message to the target cell, and/or to forward data to the target cell.

4. The method according to claim 1, wherein the method further comprises:
- maintaining the data transmission with the source cell in response to the handover from the source cell to the target cell failing and no radio link failure occurring in the source cell.

5. The method according to claim 4, wherein the method further comprises:
- initiating a reestablishment procedure in response to the radio link failure occurring in the source cell.

6. The method according to claim 4, wherein in response to the radio link failure occurring in the source cell, the method further comprises:
- performing cell selection, and in response to a selected cell belonging to the N candidate cells, attempting to hand over to the selected cell; or
- determining whether there is a cell that meets a CHO execution condition in the N2 candidate cells, and in response to the cell that meets the CHO execution condition being determined, attempting to hand over to the cell that meets the CHO execution condition; or
- performing cell selection, and in response to a selected cell not belonging to the N candidate cells, initiating a reestablishment procedure; or
- determining whether there is a cell that meets a CHO execution condition in the N2 candidate cells, and in response to there being no cell that meets the CHO execution condition in the N2 candidate cells, initiating a reestablishment procedure.

7. The method according to claim 1, wherein in response to the handover from the source cell to the target cell failing, the method further comprises:
- performing cell selection, and in response to a selected cell belonging to the N candidate cells, attempting to hand over to the selected cell; or
- determining whether there is a cell that meets a CHO execution condition in the N2 candidate cells, and in response to the cell that meets the CHO execution condition being determined, attempting to hand over to the cell that meets the CHO execution condition; or
- performing cell selection, and in response to a cell selected through the cell selection not belonging to the N candidate cells, initiating a reestablishment procedure; or
- determining whether there is a cell that meets a CHO execution condition in the N2 candidate cells, and in response to there being no cell that meets the CHO execution condition in the N2 candidate cells, initiating a reestablishment procedure.

8. The method according to claim 1, wherein in response to the handover from the source cell to the first cell failing, the method further comprises:
- maintaining the data transmission with the source cell in response to no radio link failure occurring in the source cell; or
- attempting to hand over to a cell other than the first cell in the N1 candidate cells; or
- performing cell selection, and in response to a selected cell belonging to the N candidate cells, attempting to hand over to the selected cell; or
- determining whether there is a cell that meets a CHO execution condition in the N2 candidate cells, and in response to the cell that meets the CHO execution condition being determined, attempting to hand over to the cell that meets the CHO execution condition; or
- performing cell selection, and in response to a selected cell not belonging to the N candidate cells, initiating a reestablishment procedure; or
- determining whether there is a cell that meets a CHO execution condition in the N2 candidate cells, and in response to there being no cell that meets the CHO execution condition in the N2 candidate cells, initiating a reestablishment procedure.

9. The method according to claim 8, wherein CHO configuration information of the N2 candidate cells is released in one of the following cases:
- in response to the reestablishment procedure being triggered;
- in response to the reestablishment procedure succeeding;
- in response to the reestablishment procedure failing; or
- in response to the handover from the source cell to the target cell failing and a terminal device that performs the handover continuing to stay in the source cell.

10. A handover method, comprising:
- sending a first message, wherein
  - the first message includes information about N candidate cells,
  - the N candidate cells comprise N1 candidate cells and N2 candidate cells,
  - the N1 candidate cells are cells for which no conditional handover CHO execution condition information is configured,
  - the N2 candidate cells are cells for which the CHO execution condition information is configured,
  - N and N2 are integers greater than 1 or equal to 1, and N1 is an integer greater than 0; and
- maintaining data transmission with a terminal device in a process in which the terminal device hands over from a source cell to a target cell, wherein the target cell belongs to the N candidate cells.

11. The method according to claim 10, wherein the maintaining the data transmission with the terminal device includes:
- maintaining the data transmission with the terminal device during running of a timer; and
- disconnecting the data transmission with the terminal device in response to the timer stopping.

12. The method according to claim 11, wherein a moment of starting the timer is one of the following:
- a moment of sending the first message,
- a moment of receiving a second message, wherein the second message is received from the terminal device, and indicates to send an early forwarding transfer message to the target cell and/or to forward data to the target cell,
- a moment of receiving a third message, wherein the third message is received from the target cell, and indicates to send the early forwarding transfer message to the target cell and/or to forward the data to the target cell,
- after a handover success message sent by the target cell is received, or
- a moment of receiving information about the target cell.

13. A communication apparatus, comprising:
- a processor; and
- a memory coupled with the processor and including instructions that, in response to being executed by the processor, cause the apparatus to:
- receive a first message, wherein
  - the first message includes information about N candidate cells,
  - the N candidate cells comprise N1 candidate cells and N2 candidate cells,
  - the N1 candidate cells are cells for which no conditional handover (CHO) execution condition information is configured,
  - the N2 candidate cells are cells for which the CHO execution condition information is configured,
  - N and N2 are integers greater than 1 or equal to 1, and N1 is an integer greater than 0 or equal to 0; and
- perform a handover from a source cell to a target cell, wherein the target cell belongs to the N candidate cells, and maintain data transmission with the source cell in a process of the handover from the source cell to the target cell,
- wherein in response to the handover from the source cell to the target cell failing and a radio link failure occurring in the source cell, the apparatus is caused to:
- initiate a reestablishment procedure; or
- perform cell selection, and in response to a selected cell belonging to the N candidate cells, attempt to hand over to the selected cell; or
- determine whether there is a cell that meets a CHO execution condition in the N2 candidate cells, and in response to the cell that meets the CHO execution condition being determined, attempt to hand over to the cell that meets the CHO execution condition; or
- perform cell selection, and in response to a selected cell not belonging to the N candidate cells, initiate a reestablishment procedure; or
- determine whether there is a cell that meets a CHO execution condition in the N2 candidate cells, and in response to there being no cell that meets the CHO execution condition in the N2 candidate cells, initiating a reestablishment procedure.

14. The communication apparatus according to claim 13, wherein the apparatus is caused to:
- maintain the data transmission with the source cell during running of a timer; and
- disconnect the data transmission with the source cell in response to the timer stopping.

15. The communication apparatus according to claim 14, wherein
a moment of starting the timer is one of the following:
- a moment of receiving the first message,
- a moment of determining the target cell,
- a moment of sending, to the source cell, information indicating the target cell,
- a moment of sending a preamble to the target cell,
- a moment of receiving a random access response message,
- a moment of receiving a contention resolution message,
- a moment of sending a radio resource control (RRC) reconfiguration complete message to the target cell, or
- a moment of sending a second message to the source cell, wherein the second message indicates the source cell to send an early forwarding transfer message to the target cell, and/or to forward data to the target cell.

16. The communication apparatus according to claim 13, wherein the communication apparatus is caused to maintain the data transmission with the source cell in response to the handover from the source cell to the target cell failing and no radio link failure occurring in the source cell.

17. The communication apparatus according to claim 13, wherein the apparatus is caused to preferentially hand over from the source cell to a first cell, wherein the first cell belongs to the N1 candidate cells.

18. The communication apparatus according to claim 13, wherein the apparatus is caused to release CHO configuration information of the N2 candidate cells in one of the following cases:
- in response to the reestablishment procedure being triggered;
- in response to the reestablishment procedure succeeding;
- in response to the reestablishment procedure failing; or
- in response to the handover from the source cell to the target cell failing and the apparatus continuing to stay in the source cell.

* * * * *